(12) United States Patent
Borisevich et al.

(10) Patent No.: US 12,440,135 B2
(45) Date of Patent: Oct. 14, 2025

(54) SYSTEMS AND METHODS FOR CALIBRATION OF AN OPTICAL MEASUREMENT SYSTEM

(71) Applicant: HI LLC, Los Angeles, CA (US)

(72) Inventors: Alex Borisevich, Lancaster, CA (US); Ryan Field, Culver City, CA (US); Han Yong Ban, Los Angeles, CA (US)

(73) Assignee: HI LLC, Culver City, CA (US)

( * ) Notice: Subject to any disclaimer, the term of this patent is extended or adjusted under 35 U.S.C. 154(b) by 884 days.

(21) Appl. No.: 17/668,722

(22) Filed: Feb. 10, 2022

(65) Prior Publication Data

US 2022/0273212 A1 Sep. 1, 2022

Related U.S. Application Data

(60) Provisional application No. 63/208,341, filed on Jun. 8, 2021, provisional application No. 63/154,162, filed on Feb. 26, 2021.

(51) Int. Cl.
*A61B 5/16* (2006.01)
*A61B 5/00* (2006.01)
*A61B 5/375* (2021.01)

(52) U.S. Cl.
CPC ............ *A61B 5/165* (2013.01); *A61B 5/375* (2021.01); *A61B 5/4064* (2013.01); *A61B 5/6803* (2013.01)

(58) Field of Classification Search
CPC ............ A61B 5/375; A61B 2562/0238; A61B 5/0059; A61B 5/0064; A61B 5/0261;
(Continued)

(56) References Cited

U.S. PATENT DOCUMENTS

| 5,309,458 A | 5/1994 | Carl |
| 5,761,230 A | 6/1998 | Oono et al. |

(Continued)

FOREIGN PATENT DOCUMENTS

| CN | 200950235 | 9/2007 |
| WO | 1999053577 | 10/1999 |

(Continued)

OTHER PUBLICATIONS

"International Search Report and Written Opinion mailed May 23, 2022 in corresponding International Application No. PCT/US2022/016004 with the International Filing Date of Feb. 10, 2022".

(Continued)

*Primary Examiner* — Eric F Winakur
*Assistant Examiner* — Sienna C Pyle
(74) *Attorney, Agent, or Firm* — ALG Intellectual Property, LLC

(57) ABSTRACT

An illustrative optical measurement system includes a light source configured to emit light directed at a target. The system further includes a detector configured to detect arrival times for photons of the light after the light is scattered by the target. The system further includes a temperature sensor configured to output a temperature signal representative of a temperature of the light source. The system further includes an optical sensor configured to output a power signal representative of an optical power level of the light emitted by the light source. The system further includes a driver circuit configured to output, based on the temperature signal and the power signal, an input current for the light source.

27 Claims, 22 Drawing Sheets

(58) Field of Classification Search
CPC . A61B 5/6803; A61B 5/14553; A61B 5/6801; A61B 5/6814; A61B 5/6826; A61B 5/6824; G01S 7/4868; G01S 7/4863; G01J 2001/442; G01N 21/49
See application file for complete search history.

(56) References Cited

U.S. PATENT DOCUMENTS

| | | | |
|---|---|---|---|
| 5,853,370 | A | 12/1998 | Chance et al. |
| 6,240,309 | B1 | 5/2001 | Yamashita et al. |
| 6,384,663 | B2 | 5/2002 | Cova et al. |
| 6,640,133 | B2 | 10/2003 | Yamashita |
| 6,683,294 | B1 | 1/2004 | Herbert et al. |
| 7,356,364 | B1* | 4/2008 | Bullock ............... A61B 5/1459 600/316 |
| 7,356,365 | B2 | 4/2008 | Schurman |
| 7,547,872 | B2 | 6/2009 | Niclass et al. |
| 7,774,047 | B2 | 8/2010 | Yamashita et al. |
| 8,026,471 | B2 | 9/2011 | Itzler |
| 8,078,250 | B2 | 12/2011 | Chen et al. |
| 8,082,015 | B2 | 12/2011 | Yodh et al. |
| 8,633,431 | B2 | 1/2014 | Kim |
| 8,817,257 | B2 | 8/2014 | Herve |
| 9,058,081 | B2 | 6/2015 | Baxter |
| 9,076,707 | B2 | 7/2015 | Harmon |
| 9,131,861 | B2 | 9/2015 | Ince et al. |
| 9,316,735 | B2 | 4/2016 | Baxter |
| 9,401,448 | B2 | 7/2016 | Bienfang et al. |
| 9,419,635 | B2 | 8/2016 | Kumar et al. |
| 9,442,201 | B2 | 9/2016 | Schmand et al. |
| 9,529,079 | B1 | 12/2016 | Droz |
| 9,574,936 | B2 | 2/2017 | Heinonen |
| 9,946,344 | B2 | 4/2018 | Ayaz et al. |
| D817,553 | S | 5/2018 | Aaskov et al. |
| D825,112 | S | 8/2018 | Saez |
| 10,158,038 | B1 | 12/2018 | Do Valle et al. |
| 10,340,408 | B1 | 7/2019 | Katnani |
| 10,424,683 | B1 | 9/2019 | Do Valle |
| 10,515,993 | B2 | 12/2019 | Field et al. |
| 10,697,829 | B2 | 6/2020 | Delic |
| 10,772,561 | B2 | 9/2020 | Donaldson |
| 10,809,796 | B2 | 10/2020 | Armstrong-Muntner |
| 10,912,504 | B2 | 2/2021 | Nakaji |
| 11,006,876 | B2 | 5/2021 | Johnson |
| 11,006,878 | B2 | 5/2021 | Johnson |
| 2004/0057478 | A1 | 3/2004 | Saito |
| 2006/0153256 | A1* | 7/2006 | Sanchez ............... H01S 5/042 372/34 |
| 2006/0197452 | A1 | 9/2006 | Zhang |
| 2007/0083097 | A1 | 4/2007 | Fujiwara |
| 2009/0012402 | A1 | 1/2009 | Mintz |
| 2010/0030041 | A1* | 2/2010 | Bruinsma .......... A61B 5/14552 600/322 |
| 2011/0109667 | A1 | 5/2011 | Kim et al. |
| 2011/0190641 | A1 | 8/2011 | Tateishi et al. |
| 2011/0208675 | A1 | 8/2011 | Shoureshi et al. |
| 2013/0342835 | A1 | 12/2013 | Blacksberg |
| 2014/0191115 | A1 | 7/2014 | Webster et al. |
| 2014/0217264 | A1 | 8/2014 | Shepard |
| 2014/0275891 | A1 | 9/2014 | Muehlemann et al. |
| 2015/0038811 | A1 | 2/2015 | Asaka |
| 2015/0041625 | A1 | 2/2015 | Dutton |
| 2015/0054111 | A1 | 2/2015 | Niclass et al. |
| 2015/0077279 | A1 | 3/2015 | Song |
| 2015/0150505 | A1 | 6/2015 | Kaskoun et al. |
| 2015/0327777 | A1 | 11/2015 | Kostic et al. |
| 2015/0364635 | A1 | 12/2015 | Bodlovic et al. |
| 2017/0030769 | A1 | 2/2017 | Clemens et al. |
| 2017/0052065 | A1 | 2/2017 | Sharma et al. |
| 2017/0089756 | A1* | 3/2017 | Scott ............... G01S 7/4863 |
| 2017/0176596 | A1 | 6/2017 | Shpunt et al. |
| 2017/0179173 | A1 | 6/2017 | Mandai et al. |
| 2017/0202518 | A1 | 7/2017 | Furman et al. |
| 2017/0281086 | A1 | 10/2017 | Donaldson |
| 2017/0363467 | A1 | 12/2017 | Clemens et al. |
| 2017/0367650 | A1 | 12/2017 | Wallois |
| 2018/0014741 | A1 | 1/2018 | Chou |
| 2018/0027196 | A1 | 1/2018 | Yang et al. |
| 2018/0039053 | A1 | 2/2018 | Kremer et al. |
| 2018/0070830 | A1 | 3/2018 | Sutin et al. |
| 2018/0070831 | A1 | 3/2018 | Sutin et al. |
| 2018/0089848 | A1 | 3/2018 | Yang et al. |
| 2019/0113385 | A1 | 4/2019 | Fukuchi |
| 2019/0175068 | A1 | 6/2019 | Everdell |
| 2019/0239753 | A1* | 8/2019 | Wentz ............... G01J 3/2803 |
| 2019/0261869 | A1* | 8/2019 | Franceschini ........ A61B 5/7203 |
| 2019/0355773 | A1* | 11/2019 | Field ............... H01L 27/14634 |
| 2019/0355861 | A1 | 11/2019 | Katnani |
| 2019/0363210 | A1 | 11/2019 | Do Valle |
| 2019/0388018 | A1 | 12/2019 | Horstmeyer |
| 2020/0060542 | A1 | 2/2020 | Alford |
| 2020/0116838 | A1 | 4/2020 | Erdogan |
| 2020/0196932 | A1 | 6/2020 | Johnson |
| 2020/0253479 | A1 | 8/2020 | Nurmikko |
| 2020/0315510 | A1 | 10/2020 | Johnson |
| 2020/0337624 | A1 | 10/2020 | Johnson |
| 2020/0390358 | A1 | 12/2020 | Johnson |

FOREIGN PATENT DOCUMENTS

| | | | | |
|---|---|---|---|---|
| WO | WO-2006052682 | A2 * | 5/2006 | ............... F21K 9/64 |
| WO | 2018033751 | | 2/2018 | |

OTHER PUBLICATIONS

"Fundamentals of Laser Diode Control", 2021 Newport Corp. https://www.newport.com/n/laser-diode-control (2021).

Alayed, et al., "Characterization of a Time-Resolved Diffuse Optical Spectroscopy Prototype Using Low-Cost, Compact Single Photon Avalanche Detectors for Tissue Optics Applications", Sensors 2018, 18, 3680; doi:10.3390/s18113680, Oct. 29, 2018.

Ali, et al., "FPGA-based control of thermoelectric coolers for laser diode temperature regulation", International Journal of Engineering Science and Technology, 4(4), pp. 1628-1633, Apr. 2012.

Ban, et al., "Kernel Flow: a high channel count scalable TD-fNIRS system", https://www.spiedigitallibrary.org/conference-proceedings-of-spie Proc. of SPIE vol. 11663, 116630B CCC code: 1605-7422/21/$21 doi: 10.1117/12.2582888, Mar. 5, 2021.

Chen, et al., "Semiconductor Laser High-precision Temperature Control System Basing on Digital Signal Processing", 2010 International Conference on Electrical and Control Engineering (pp. 1880-1883). IEEE (2010).

Chkalov, et al., "Precision Medium-Power Laser Diode Drivers: Design Principles and Functional Features", 2019 International Russian Automation Conference (RusAutoCon) (pp. 1-5). IEEE (2019).

Contini, et al., "Photon migration through a turbid slab described by a model based on diffusion approximation. I. Theory", Appl. Opt. 36(19), 4587 (1997).

Di Sieno, et al., "Probe-hosted large area silicon photomultiplier and high-throughput timing electronics for enhanced performance time-domain functional near-infrared spectroscopy", Biomed. Opt. Express 11(11), 6389 (2020).

Fishburn, et al., "Temporal Derivative Distribution Repair (TDDR): A motion correction method for fNIRS", Neuroimage. Jan. 1, 2019; 184: 171-179. doi:10.1016/j.neuroimage.2018.09.025.

Huang, et al., "A novel power stability drive system of semiconductor Laser Diode for high-precision measurement", Measurement and Control, 52(5-6), pp. 462-472, 2019.

Huppert, et al., "HomER: a review of time-series analysis methods for near-infrared spectroscopy of the brain", Appl. Opt. 48(10), D280 (2009).

Kienle, et al., "Improved solutions of the steady-state and the time-resolved diffusion equations for reflectance from a semi-infinite turbid medium", J. Opt. Soc. Am. A 14(1), 246 (1997).

Konugolu, et al., "Broadband (600-1350 nm) Time-Resolved Diffuse Optical Spectrometer for Clinical Use", IEEE Journal of Selected Topics in Quantum Electronics, vol. 22, No. 3, May/Jun. 2016.

(56) References Cited

OTHER PUBLICATIONS

Lacerenza, et al., "Wearable and wireless time-domain near-infrared spectroscopy system for brain and muscle hemodynamic monitoring", Biomed. Opt. Express 11(10), 5934 (2020).

Lange, et al., "Clinical Brain Monitoring with Time Domain NIRS: A Review and Future Perspectives", Applied Sciences 9(8), 1612 (2019).

Lange, et al., "Maestros: A Multiwavelength Time-Domain NIRS System to Monitor Changes in Oxygenation and Oxidation State of Cytochrome-C-Oxidase", IEEE J. Select. Topics Quantum Electron. 25(1), 1-12 (2019).

Martelli, et al., "Optimal estimation reconstruction of the optical properties of a two-layered tissue phantom from time-resolved single-distance measurements", Journal of Biomedical Optics 20(11), 115001 (Nov. 2015).

Mora, et al., "Fast silicon photomultiplier improves signal harvesting and reduces complexity in time-domain diffuse optics", Opt. Express 23(11), 13937 (2015).

Pifferi, et al., "Performance assessment of photon migration instruments: the MEDPHOT protocol", Applied Optics, 44(11), 2104-2114 (2005).

Prahl, et al., "Optical Absorption of Hemoglobin", http://omlc.ogi.edu/spectra/hemoglobin/index.html, 1999.

Re, et al., "Multi-channel medical device for time domain functional near infrared spectroscopy based on wavelength space multiplexing", Biomed. Opt. Express 4(10), 2231 (2013).

Renna, et al., "Eight-Wavelength, Dual Detection Channel Instrument for Near-Infrared Time-Resolved Diffuse Optical Spectroscopy", IEEE J. Select. Topics Quantum Electron. 25(1), 1-11 (2019).

Torricelli, et al., "Time domain functional NIRS imaging for human brain mapping", NeuroImage 85, 28-50 (2014).

Tran, et al., "Si-based GeSn photodetectors towards mid-infrared imaging applications, ACS Photonics 2019, 6, 11, 2807-2815, Publication Date: Oct. 2, 2019.

Wabnitz, et al., "Depth-selective data analysis for time-domain fNIRS: moments vs. time windows", Biomed. Opt. Express 11(8), 4224 (2020).

Wabnitz, et al., "Performance assessment of time-domain optical brain imagers, part 1: basic instrumental performance protocol", Journal of Biomedical Optics 19(8), 086010 (Aug. 2014).

Wabnitz, et al., "Performance assessment of time-domain optical brain imagers, part 2: nEUROPt protocol", Journal of Biomedical Optics 19(8), 086012 (Aug. 2014).

Wojtkiewicz, et al., "Self-calibrating time-resolved near infrared spectroscopy", Biomed. Opt. Express 10(5), 2657 (2019).

Zhang, et al., Research on Drive and Control Technology of External Modulated DFB Laser Diode, 2009 9th International Conference on Electronic Measurement & Instruments (pp. 3-961). IEEE (2009).

Zhang, et al., Thermal management for a micro semiconductor laser based on thermoelectric cooling, Applied Thermal Engineering, 90, pp. 664-673, Nov. 5, 2015.

Zucchelli, et al., "Method for the discrimination of superficial and deep absorption variations by time domain fNIRS", 2013 OSA Dec. 1, 2013 | vol. 4, No. 12 | DOI:10.1364/BOE.4.002893 | Biomedical Optics Express 2893.

"Fundamentals of Laser Diode Control", 2021 Newport Corp. https://www.newport.com/n/laser-diode-control.

Alayed, et al., "Characterization of a Time-Resolved Diffuse Optical Spectroscopy Prototype Using Low-Cost, Compact Single Photon Avalanche Detectors for Tissue Optics Applications", Sensors 2018, 18, 3680; doi:10.3390/s18113680.

Ali, et al., "FPGA-based control of thermoelectric coolers for laser diode temperature regulation", International Journal of Engineering Science and Technology, 4(4), pp. 1628-1633.

Ban, et al., "Kernel Flow: a high channel count scalable TD-fNIRS system", https://www.spiedigitallibrary.org/conference-proceedings-of-spie Proc. of SPIE vol. 11663, 116630B CCC code: 1605-7422/21/$21 doi: 10.1117/12.2582888.

Chen, et al., "Semiconductor Laser High-precision Temperature Control System Basing on Digital Signal Processing", 2010 International Conference on Electrical and Control Engineering (pp. 1880-1883). IEEE.

Chkalov, et al., "Precision Medium-Power Laser Diode Drivers: Design Principles and Functional Features", 2019 International Russian Automation Conference (RusAutoCon) (pp. 1-5). IEEE.

Pifferi, et al., "Performance assessment of photon migration instruments: the MEDPHOT protocol", Applied Optics, 44(11), 2104-2114.

Renna, et al., "Eight-Wavelength, Dual Detection Channel Instrument for Near-Infrared Time-Resolved Diffuse Optica Spectroscopy", IEEE J. Select. Topics Quantum Electron. 25(1), 1-11 (2019).

Zhang, et al., Research on Drive and Control Technology of External Modulated DFB Laser Diode, 2009 9th International Conference on Electronic Measurement & Instruments (pp. 3-961). IEEE.

Zhang, et al., Thermal management for a micro semiconductor laser based on thermoelectric cooling, Applied Thermal Engineering, 90, pp. 664-673.

\* cited by examiner

SYSTEMS AND METHODS FOR CALIBRATION OF AN OPTICAL MEASUREMENT SYSTEM

RELATED APPLICATIONS

The present application claims priority under 35 U.S.C. § 119(e) to U.S. Provisional Patent Application No. 63/208,341, filed on Jun. 8, 2021, and to U.S. Provisional Patent Application No. 63/154,162, filed on Feb. 26, 2021, which is incorporated herein by reference in its entirety.

BACKGROUND INFORMATION

An optical measurement device may detect blood oxygenation levels and/or blood volume levels by measuring the change in shape of laser pulses after they have passed through target tissue, e.g., brain, muscle, finger, etc. The shape of laser pulses may include a temporal shape, as represented for example by a histogram generated by a time-to-digital converter (TDC) coupled to an output of a photodetector. The laser pulses may be generated by a light source (e.g., a laser) emitting light at a particular optical power level. The particular optical power level may be controlled by an input current (e.g., an injection current) to the light source. However, characteristics of the light source (e.g., a temperature) may affect a relationship between the output optical power level and the input current level.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
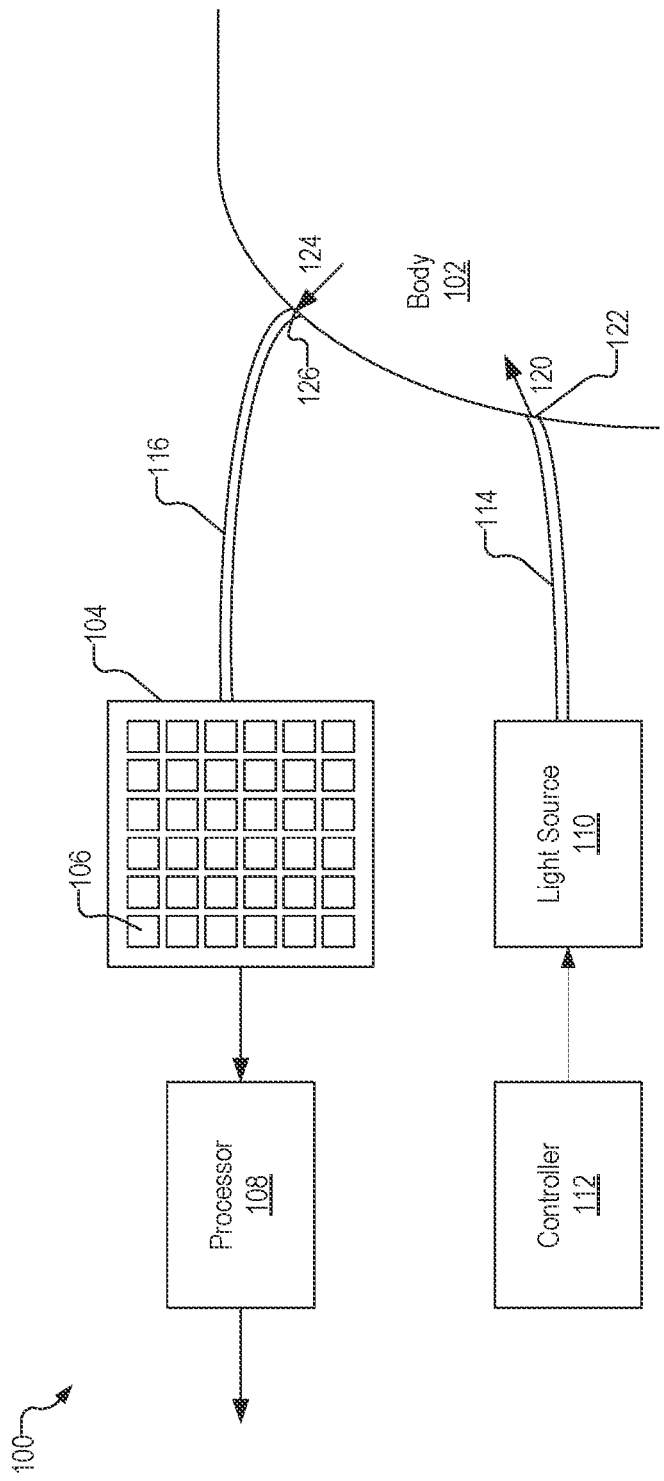
FIG. 1 shows an exemplary optical measurement system.

In accordance with the systems and methods described herein, an optical measurement system may include a light source configured to emit light directed at a target, a detector configured to detect arrival times for photons of the light after the light is scattered by the target, a temperature sensor configured to output a temperature signal representative of a temperature of the light source, an optical sensor configured to output a power signal representative of an optical power level of the light emitted by the light source, and a driver circuit configured to output, based on the temperature signal and the power signal, an input current for the light source.

For example, an optical measurement system as described herein may include a driver circuit configured to determine an appropriate input current for a light source for a particular output optical power level. The appropriate input current may change based on characteristics of the light source, such as temperature. The optical measurement system may include a temperature sensor configured to measure the temperature of the light source. The driver circuit may adjust the input current based on the temperature to maintain the particular output optical power level (and/or to output a different particular output optical power level). The optical measurement system may further include an optical sensor configured to measure the output optical power level and provide feedback to the driver circuit. The driver circuit may adjust the feedback also based on the temperature of the light source.

Such adjustments to the input current based on temperature and/or output optical power level of the light source may result in consistent measurements by a detector of the optical measurement system despite thermal variance. Such consistent measurements may allow more accurate and useful metrics and predictions (e.g., of mental states of a user, blood oxygenation levels of the user) based on histogram data generated based on the measurements.

Mental states described herein refer to the measured neural activity related to physiological brain states and/or mental brain states, e.g., joy, excitement, relaxation, surprise, fear, stress, anxiety, sadness, anger, disgust, contempt, contentment, calmness, focus, attention, approval, creativity, positive or negative reflections/attitude on experiences or the use of objects, etc. Further details on the methods and systems related to a predicted brain state, physiological functions, behavior, preferences, or attitude of the user, and the creation, training, and use of neuromes can be found in U.S. patent application Ser. No. 17/188,298, filed Mar. 1, 2021, issued as U.S. Pat. No. 11,132,625. Exemplary measurement systems and methods using biofeedback for awareness and modulation of mental state are described in more detail in U.S. patent application Ser. No. 16/364,338, filed Mar. 26, 2019, issued as U.S. Pat. No. 11,006,876. Exemplary measurement systems and methods used for detecting and modulating the mental state of a user using entertainment selections, e.g., music, film/video, are described in more detail in U.S. patent application Ser. No. 16/835,972, filed Mar. 31, 2020, issued as U.S. Pat. No. 11,006,878. Exemplary measurement systems and methods used for detecting and modulating the mental state of a user using product formulation from, e.g., beverages, food, selective food/drink ingredients, fragrances, and assessment based on product-elicited brain state measurements are described in more detail in U.S. patent application Ser. No. 16/853,614, filed Apr. 20, 2020, issued as U.S. Pat. No. 11,172,869. Exemplary measurement systems and methods used for detecting and modulating the mental state of a user through awareness of priming effects are described in more detail in U.S. patent application Ser. No. 16/885,596, filed May 28, 2020, published as US2020/0390358A1. Exemplary measurement systems and methods used for wellness therapy, such as pain management regime, are described more fully in U.S. Provisional Application No. 63/188,783, filed May 14, 2021. These applications and corresponding U.S. patents and publications are incorporated herein by reference in their entirety.

These and other advantages and benefits of the present systems and methods are described more fully herein.

FIG. 1 shows an exemplary optical measurement system 100 configured to perform an optical measurement operation with respect to a body 102. Optical measurement system 100 may, in some examples, be portable and/or wearable by a user. Optical measurement systems that may be used in connection with the embodiments described herein are described more fully in U.S. patent application Ser. No. 17/176,315, filed Feb. 16, 2021 and published as US2021/0259638A1; U.S. patent application Ser. No. 17/176,309, filed Feb. 16, 2021 and published as US2021/0259614A1; U.S. patent application Ser. No. 17/176,460, filed Feb. 16, 2021 and issued as U.S. Pat. No. 11,096,620; U.S. patent application Ser. No. 17/176,470, filed Feb. 16, 2021 and published as US2021/0259619A1; U.S. patent application Ser. No. 17/176,487, filed Feb. 16, 2021 and published as US2021/0259632A1; U.S. patent application Ser. No. 17/176,539, filed Feb. 16, 2021 and published as US2021/0259620A1; U.S. patent application Ser. No. 17/176,560, filed Feb. 16, 2021 and published as US2021/0259597A1; U.S. patent application Ser. No. 17/176,466, filed Feb. 16, 2021 and published as US2021/0263320A1; Han Y. Ban, et al., "Kernel Flow: A High Channel Count Scalable TD-fNIRS System," SPIE Photonics West Conference (Mar. 6, 2021); and Han Y. Ban, et al., "Kernel Flow: a high channel count scalable time-domain functional near-infrared spectroscopy system," Journal of Biomedical Optics (Jan. 18, 2022), which applications and publications are incorporated herein by reference in their entirety.

In some examples, optical measurement operations performed by optical measurement system 100 are associated with a time domain-based optical measurement technique. Example time domain-based optical measurement techniques include, but are not limited to, time-correlated single-photon counting (TCSPC), time domain near infrared spectroscopy (TD-NIRS), time domain diffusive correlation spectroscopy (TD-DCS), and time domain Digital Optical Tomography (TD-DOT).

Optical measurement system 100 (e.g., an optical measurement system that is implemented by a wearable device or other configuration, and that employs a time domain-based (e.g., TD-NIRS) measurement technique) may detect blood oxygenation levels and/or blood volume levels by measuring the change in shape of laser pulses after they have passed through target tissue, e.g., brain, muscle, finger, etc. As used herein, a shape of laser pulses refers to a temporal shape, as represented for example by a histogram generated by a time-to-digital converter (TDC) coupled to an output of a photodetector, as will be described more fully below.

As shown, optical measurement system 100 includes a detector 104 that includes a plurality of individual photodetectors (e.g., photodetector 106), a processor 108 coupled to detector 104, a light source 110, a controller 112, and optical conduits 114 and 116 (e.g., light pipes). However, one or more of these components may not, in certain embodiments, be considered to be a part of optical measurement system 100. For example, in implementations where optical measurement system 100 is wearable by a user, processor 108 and/or controller 112 may in some embodiments be separate from optical measurement system 100 and not configured to be worn by the user.

Detector 104 may include any number of photodetectors 106 as may serve a particular implementation, such as 2" photodetectors (e.g., 256, 512, ..., 16384, etc.), where n is an integer greater than or equal to one (e.g., 4, 5, 8, 10, 11, 14, etc.). Photodetectors 106 may be arranged in any suitable manner.

Photodetectors 106 may each be implemented by any suitable circuit configured to detect individual photons of light incident upon photodetectors 106. For example, each photodetector 106 may be implemented by a single photon avalanche diode (SPAD) circuit and/or other circuitry as may serve a particular implementation.

Processor 108 may be implemented by one or more physical processing (e.g., computing) devices. In some examples, processor 108 may execute instructions (e.g., software) configured to perform one or more of the operations described herein.

Light source 110 may be implemented by any suitable component configured to generate and emit light. For example, light source 110 may be implemented by one or more laser diodes, distributed feedback (DFB) lasers, super luminescent diodes (SLDs), light emitting diodes (LEDs), diode-pumped solid-state (DPSS) lasers, super luminescent light emitting diodes (sLEDs), vertical-cavity surface-emitting lasers (VCSELs), titanium sapphire lasers, micro light emitting diode (m LEDs), and/or any other suitable laser or light source configured to emit light in one or more discrete wavelengths or narrow wavelength bands. In some examples, the light emitted by light source 110 is high coherence light (e.g., light that has a coherence length of at least 5 centimeters) at a predetermined center wavelength. In some examples, the light emitted by light source 110 is emitted as a plurality of alternating light pulses of different wavelengths.

Light source 110 is controlled by controller 112, which may be implemented by any suitable computing device (e.g., processor 108), integrated circuit, and/or combination of hardware and/or software as may serve a particular implementation. In some examples, controller 112 is configured to control light source 110 by turning light source 110 on and off and/or setting an intensity of light generated by light source 110. Controller 112 may be manually operated by a user, or may be programmed to control light source 110 automatically.

Light emitted by light source 110 travels via an optical conduit 114 (e.g., a light pipe, a single-mode optical fiber, and/or or a multi-mode optical fiber) to body 102 of a subject. Body 102 may include any suitable turbid medium. For example, in some implementations, body 102 is a head or any other body part of a human or other animal. Alternatively, body 102 may be a non-living object. For illustrative purposes, it will be assumed in the examples provided herein that body 102 is a human head.

Body 102 may include any suitable turbid medium. For example, in some implementations, body 102 is a head, hand, wrist, finger, foot, chest, ear, or any other body part of a human or other animal. Alternatively, body 102 may be a non-living object. For illustrative purposes, it will be assumed in the examples provided herein that body 102 is a human head, human hand, human wrist, human finger, human earlobe, human foot, or human toe.

As indicated by an arrow 120, light emitted by light source 110 enters body 102 at a first location 122 on body 102. Accordingly, a distal end of optical conduit 114 may be positioned at (e.g., right above, in physical contact with, or physically attached to) first location 122 (e.g., to a scalp of the subject). In some examples, the light may emerge from optical conduit 114 and spread out to a certain spot size on body 102 to fall under a predetermined safety limit. At least a portion of the light indicated by arrow 120 may be scattered within body 102.

As used herein, "distal" means nearer, along the optical path of the light emitted by light source 110 or the light received by detector 104, to the target (e.g., within body 102) than to light source 110 or detector 104. Thus, the distal end of optical conduit 114 is nearer to body 102 than to light source 110, and the distal end of optical conduit 116 is nearer to body 102 than to detector 104. Additionally, as used herein, "proximal" means nearer, along the optical path of the light emitted by light source 110 or the light received by detector 104, to light source 110 or detector 104 than to body 102. Thus, the proximal end of optical conduit 114 is nearer to light source 110 than to body 102, and the proximal end of optical conduit 116 is nearer to detector 104 than to body 102.

As shown, the distal end of optical conduit 116 (e.g., a light pipe, a light guide, a waveguide, a single-mode optical fiber, and/or a multi-mode optical fiber) is positioned at (e.g., right above, in physical contact with, or physically attached to) output location 126 on body 102. In this manner, optical conduit 116 may collect at least a portion of the scattered light (indicated as light 124) as it exits body 102 at location 126 and carry light 124 to detector 104. Light 124 may pass through one or more lenses and/or other optical elements (not shown) that direct light 124 onto each of the photodetectors 106 included in detector 104.

Photodetectors 106 may be connected in parallel in detector 104. An output of each of photodetectors 106 may be accumulated to generate an accumulated output of detector 104. Processor 108 may receive the accumulated output and determine, based on the accumulated output, a temporal distribution of photons detected by photodetectors 106. Processor 108 may then generate, based on the temporal distribution, a histogram representing a light pulse response of a target (e.g., brain tissue, blood flow, etc.) in body 102. Example embodiments of accumulated outputs are described herein.

Figure 2:
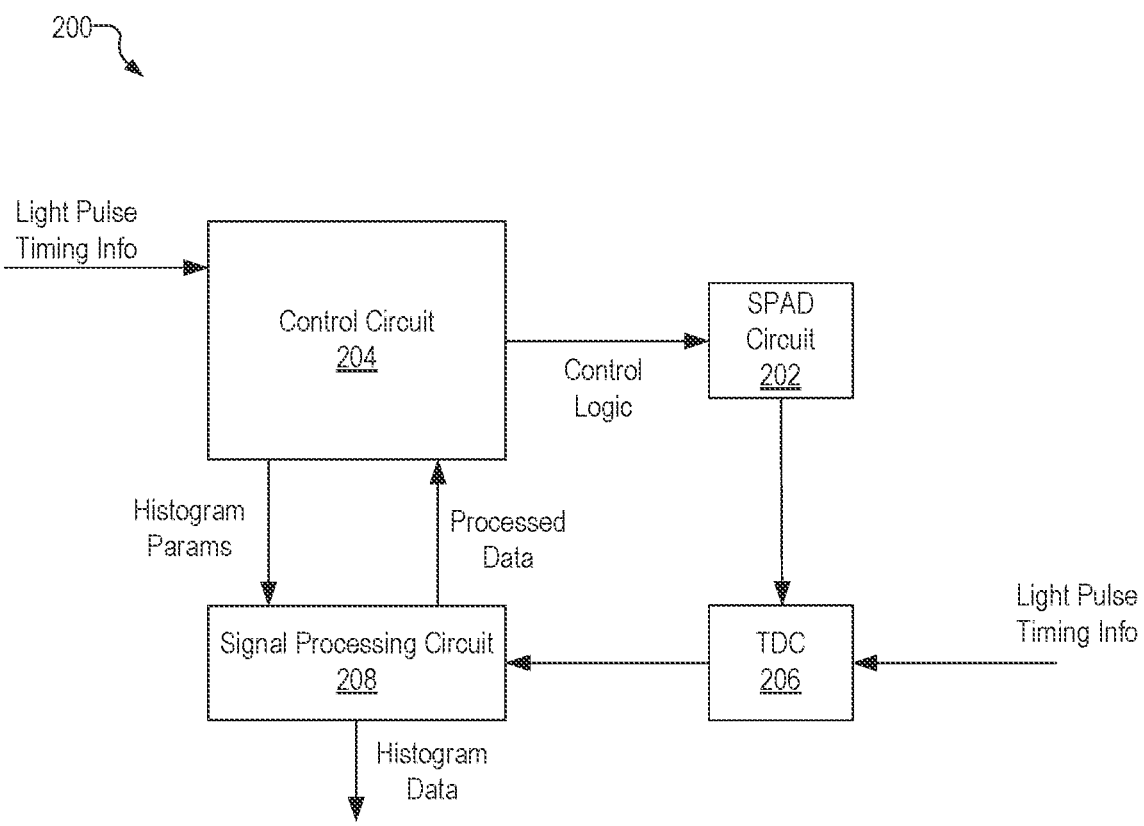
FIG. 2 illustrates an exemplary detector architecture.

FIG. 2 illustrates an exemplary detector architecture 200 that may be used in accordance with the systems and methods described herein. As shown, architecture 200 includes a SPAD circuit 202 that implements photodetector 106, a control circuit 204, a time-to-digital converter (TDC) 206, and a signal processing circuit 208. Architecture 200 may include additional or alternative components as may serve a particular implementation.

In some examples, SPAD circuit 202 may include a SPAD and a fast gating circuit configured to operate together to detect a photon incident upon the SPAD. As described herein, SPAD circuit 202 may generate an output when SPAD circuit 202 detects a photon.

The fast gating circuit included in SPAD circuit 202 may be implemented in any suitable manner. For example, the fast gating circuit may include a capacitor that is pre-charged with a bias voltage before a command is provided to arm the SPAD. Gating the SPAD with a capacitor instead of with an active voltage source, such as is done in some conventional SPAD architectures, has a number of advantages and benefits. For example, a SPAD that is gated with a capacitor may be armed practically instantaneously compared to a SPAD that is gated with an active voltage source. This is because the capacitor is already charged with the bias voltage when a command is provided to arm the SPAD. This is described more fully in U.S. Pat. No. 10,158,038 and 10,424,683, which are incorporated herein by reference in their entireties.

In some alternative configurations, such as in configurations that implement the systems and methods described herein, SPAD circuit 202 does not include a fast gating circuit. In these configurations, the SPAD included in SPAD circuit 202 may be gated in any suitable manner or be configured to operate in a free running mode with passive quenching.

Control circuit 204 may be implemented by an application specific integrated circuit (ASIC) or any other suitable circuit configured to control an operation of various components within SPAD circuit 202. For example, control circuit 204 may output control logic that puts the SPAD included in SPAD circuit 202 in either an armed or a disarmed state.

In some examples, control circuit 204 may control a gate delay, which specifies a predetermined amount of time control circuit 204 is to wait after an occurrence of a light pulse (e.g., a laser pulse) to put the SPAD in the armed state. To this end, control circuit 204 may receive light pulse timing information, which indicates a time at which a light pulse occurs (e.g., a time at which the light pulse is applied to body 102). Control circuit 204 may also control a programmable gate width, which specifies how long the SPAD is kept in the armed state before being disarmed.

Control circuit 204 is further configured to control signal processing circuit 208. For example, control circuit 204 may provide histogram parameters (e.g., time bins, number of light pulses, type of histogram, etc.) to signal processing circuit 208. Signal processing circuit 208 may generate histogram data in accordance with the histogram parameters. In some examples, control circuit 204 is at least partially implemented by controller 112.

TDC 206 is configured to measure a time difference between an occurrence of an output pulse generated by SPAD circuit 202 and an occurrence of a light pulse. To this end, TDC 206 may also receive the same light pulse timing information that control circuit 204 receives. TDC 206 may be implemented by any suitable circuitry as may serve a particular implementation.

Signal processing circuit 208 is configured to perform one or more signal processing operations on data output by TDC 206. For example, signal processing circuit 208 may generate histogram data based on the data output by TDC 206 and in accordance with histogram parameters provided by control circuit 204. To illustrate, signal processing circuit 208 may generate, store, transmit, compress, analyze, decode, and/or otherwise process histograms based on the data output by TDC 206. In some examples, signal processing circuit 208 may provide processed data to control circuit 204, which may use the processed data in any suitable manner. In some examples, signal processing circuit 208 is at least partially implemented by processor 108.

In some examples, each photodetector 106 (e.g., SPAD circuit 202) may have a dedicated TDC 206 associated therewith. For example, for an array of N photodetectors 106, there may be a corresponding array of N TDCs 206. Alternatively, a single TDC 206 may be associated with multiple photodetectors 106. Likewise, a single control circuit 204 and a single signal processing circuit 208 may be provided for a one or more photodetectors 106 and/or TDCs 206.

Figure 3:
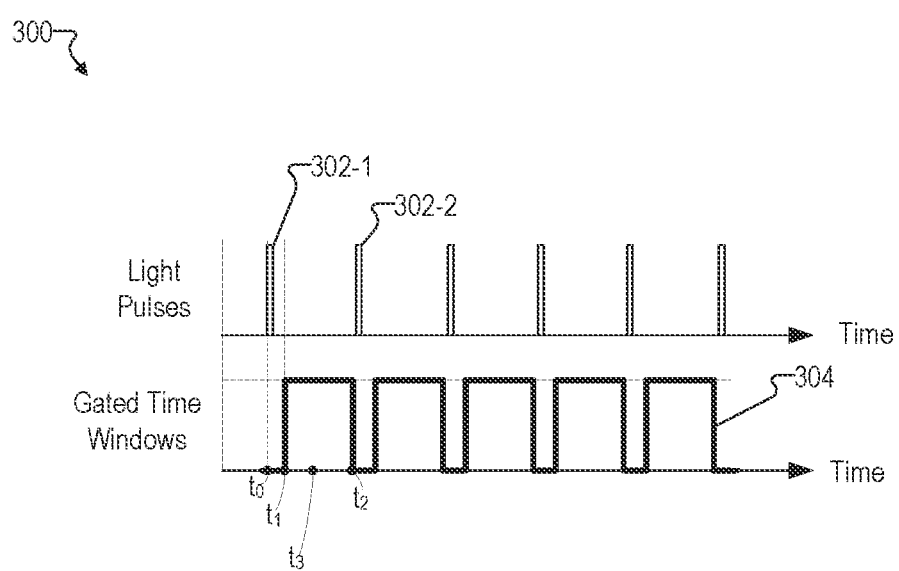
FIG. 3 illustrates an exemplary timing diagram for performing an optical measurement operation using an optical measurement system.

FIG. 3 illustrates an exemplary timing diagram 300 for performing an optical measurement operation using optical measurement system 100. The optical measurement operation may be performed in accordance with a time domain-based technique, such as TD-NIRS. Optical measurement system 100 may be configured to perform the optical measurement operation by directing light pulses (e.g., laser pulses) toward a target within a body (e.g., body 102). The light pulses may be short (e.g., 10-2000 picoseconds (ps)) and repeated at a high frequency (e.g., between 100,000 hertz (Hz) and 100 megahertz (MHz)). The light pulses may be scattered by the target and at least a portion of the scattered light may be detected by optical measurement system 100. Optical measurement system 100 may measure a time relative to the light pulse for each detected photon. By counting the number of photons detected at each time relative to each light pulse repeated over a plurality of light pulses, optical measurement system 100 may generate a histogram that represents a light pulse response of the target (e.g., a temporal point spread function (TPSF)). The terms histogram and TPSF are used interchangeably herein to refer to a light pulse response of a target.

Timing diagram 300 shows a sequence of light pulses 302 (e.g., light pulses 302-1 and 302-2) that may be applied to the target (e.g., tissue within a finger of a user, tissue within a brain of a user, blood flow, a fluorescent material used as a probe in a body of a user, etc.). Timing diagram 300 also shows a pulse wave 304 representing predetermined gated time windows (also referred as gated time periods) during which photodetectors 106 are gated ON to detect photons. As shown, light pulse 302-1 is applied at a time to. At a time $t_1$, a first instance of the predetermined gated time window begins. Photodetectors 106 may be armed at time $t_1$, enabling photodetectors 106 to detect photons scattered by the target during the predetermined gated time window. In this example, time $t_1$ is set to be at a certain time after time to, which may minimize photons detected directly from the laser pulse, before the laser pulse reaches the target. However, in some alternative examples, time $t_1$ is set to be equal to time to.

At a time $t_2$, the predetermined gated time window ends. In some examples, photodetectors 106 may be disarmed at time $t_2$. In other examples, photodetectors 106 may be reset (e.g., disarmed and re-armed) at time $t_2$ or at a time subsequent to time $t_2$. During the predetermined gated time window, photodetectors 106 may detect photons scattered by the target. Photodetectors 106 may be configured to remain armed during the predetermined gated time window such that photodetectors 106 maintain an output upon detecting a photon during the predetermined gated time window. For example, a photodetector 106 may detect a photon at a time $t_3$, which is during the predetermined gated time window between times $t_1$ and $t_2$. The photodetector 106 may be configured to provide an output indicating that the photodetector 106 has detected a photon. The photodetector 106 may be configured to continue providing the output until time $t_2$, when the photodetector may be disarmed and/or reset. Optical measurement system 100 may generate an accumulated output from the plurality of photodetectors. Optical measurement system 100 may sample the accumulated output to determine times at which photons are detected by photodetectors 106 to generate a TPSF.

As mentioned, in some alternative examples, photodetector 106 may be configured to operate in a free-running mode such that photodetector 106 is not actively armed and disarmed (e.g., at the end of each predetermined gated time window represented by pulse wave 304). In contrast, while operating in the free-running mode, photodetector 106 may be configured to reset within a configurable time period after an occurrence of a photon detection event (i.e., after photodetector 106 detects a photon) and immediately begin detecting new photons. However, only photons detected within a desired time window (e.g., during each gated time window represented by pulse wave 304) may be included in the TPSF.

Figure 4:
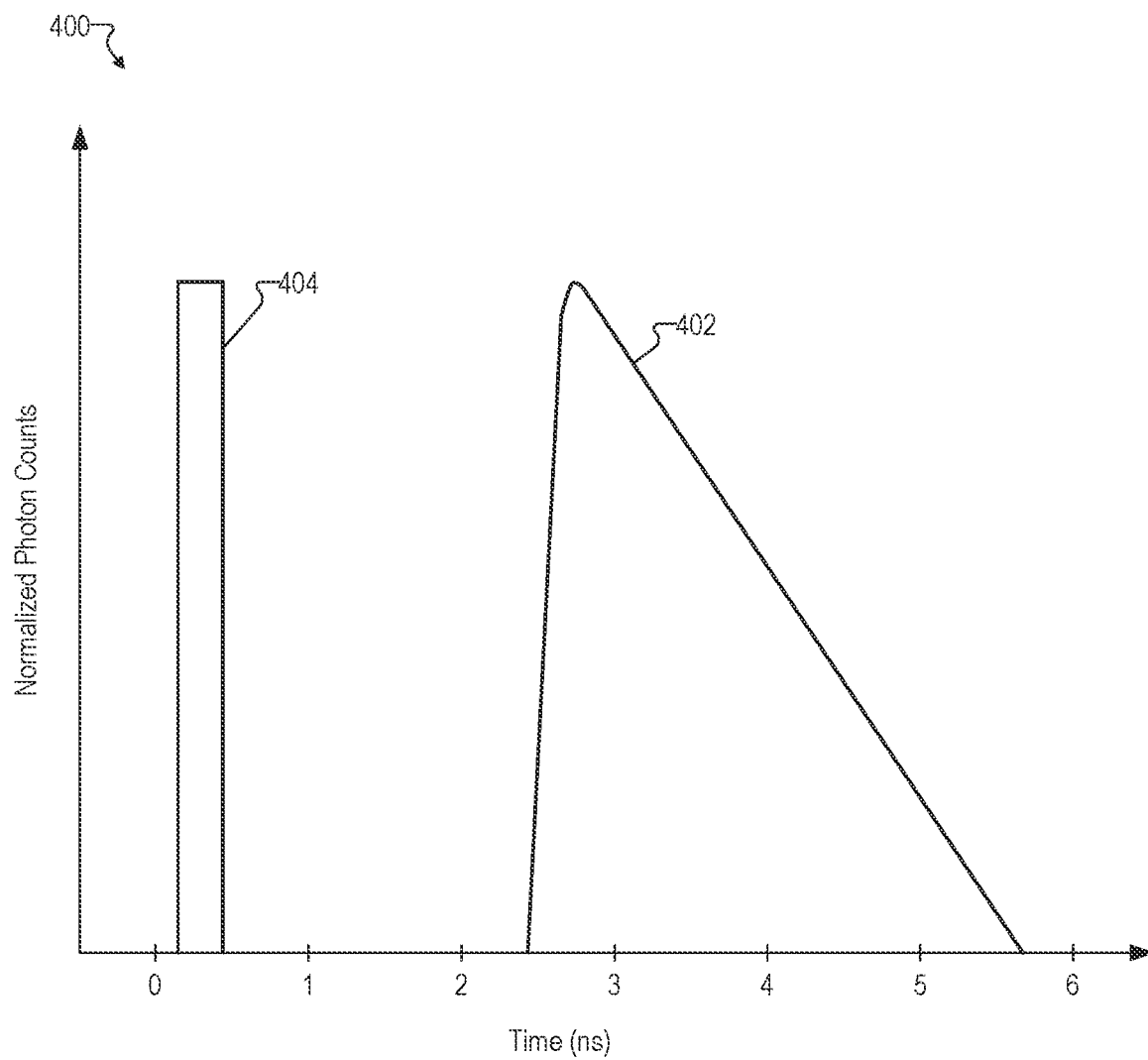
FIG. 4 illustrates a graph of an exemplary temporal point spread function that may be generated by an optical measurement system in response to a light pulse.

FIG. 4 illustrates a graph 400 of an exemplary TPSF 402 that may be generated by optical measurement system 100 in response to a light pulse 404 (which, in practice, represents a plurality of light pulses). Graph 400 shows a normalized count of photons on a y-axis and time bins on an x-axis. As shown, TPSF 402 is delayed with respect to a temporal occurrence of light pulse 404. In some examples, the number of photons detected in each time bin subsequent to each occurrence of light pulse 404 may be aggregated (e.g., integrated) to generate TPSF 402. TPSF 402 may be analyzed and/or processed in any suitable manner to determine or infer biological activity.

Optical measurement system 100 may be implemented by or included in any suitable device. For example, optical measurement system 100 may be included in a non-invasive wearable device (e.g., a headpiece) that a user may wear to perform one or more diagnostic, imaging, analytical, and/or consumer-related operations.

Figure 5:
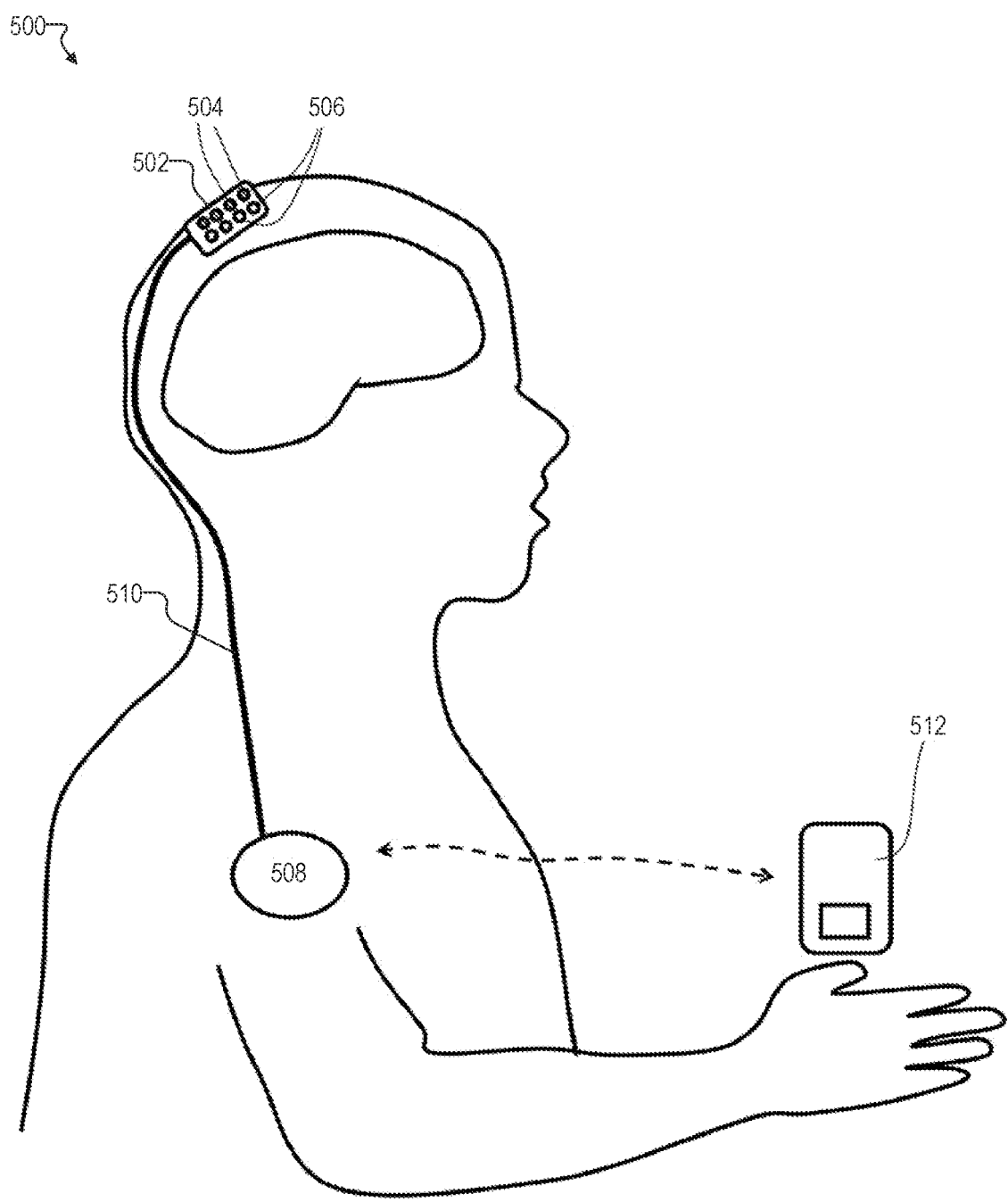
FIG. 5 shows an exemplary non-invasive wearable brain interface system.

To illustrate, FIG. 5 shows an exemplary non-invasive wearable brain interface system 500 ("brain interface system 500") that implements optical measurement system 100 (shown in FIG. 1). As shown, brain interface system 500 includes a head-mountable component 502 configured to be attached to a user's head. Head-mountable component 502 may be implemented by a cap shape that is worn on a head of a user. Alternative implementations of head-mountable component 502 include helmets, beanies, headbands, other hat shapes, or other forms conformable to be worn on a user's head, etc. Head-mountable component 502 may be made out of any suitable cloth, soft polymer, plastic, hard shell, and/or any other suitable material as may serve a particular implementation. Examples of headgears used with wearable brain interface systems are described more fully in U.S. Pat. No. 10,340,408, incorporated herein by reference in its entirety.

Head-mountable component 502 includes a plurality of detectors 504, which may implement or be similar to detector 104, and a plurality of light sources 506, which may be implemented by or be similar to light source 110. It will be recognized that in some alternative embodiments, head-mountable component 502 may include a single detector 504 and/or a single light source 506.

Brain interface system 500 may be used for controlling an optical path to the brain and for transforming photodetector measurements into an intensity value that represents an optical property of a target within the brain. Brain interface system 500 allows optical detection of deep anatomical locations beyond skin and bone (e.g., skull) by extracting data from photons originating from light source 506 and emitted to a target location within the user's brain, in contrast to conventional imaging systems and methods (e.g., optical coherence tomography (OCT)), which only image superficial tissue structures or through optically transparent structures.

Brain interface system 500 may further include a processor 508 configured to communicate with (e.g., control and/or receive signals from) detectors 504 and light sources 506 by way of a communication link 510. Communication link 510 may include any suitable wired and/or wireless communication link. Processor 508 may include any suitable housing and may be located on the user's scalp, neck, shoulders, chest, or arm, as may be desirable. In some variations, processor 508 may be integrated in the same assembly housing as detectors 504 and light sources 506.

As shown, brain interface system 500 may optionally include a remote processor 512 in communication with processor 508. For example, remote processor 512 may store measured data from detectors 504 and/or processor 508 from previous detection sessions and/or from multiple brain interface systems (not shown). Power for detectors 504, light sources 506, and/or processor 508 may be provided via a wearable battery (not shown). In some examples, processor 508 and the battery may be enclosed in a single housing, and wires carrying power signals from processor 508 and the battery may extend to detectors 504 and light sources 506. Alternatively, power may be provided wirelessly (e.g., by induction).

In some alternative embodiments, head mountable component 502 does not include individual light sources. Instead, a light source configured to generate the light that is detected by detectors 504 may be included elsewhere in brain interface system 500. For example, a light source may be included in processor 508 and coupled to head mountable component 502 through optical connections.

Optical measurement system 100 may alternatively be included in a non-wearable device (e.g., a medical device and/or consumer device that is placed near the head or other body part of a user to perform one or more diagnostic, imaging, and/or consumer-related operations). Optical measurement system 100 may alternatively be included in a sub-assembly enclosure of a wearable invasive device (e.g., an implantable medical device for brain recording and imaging).

Figure 6:
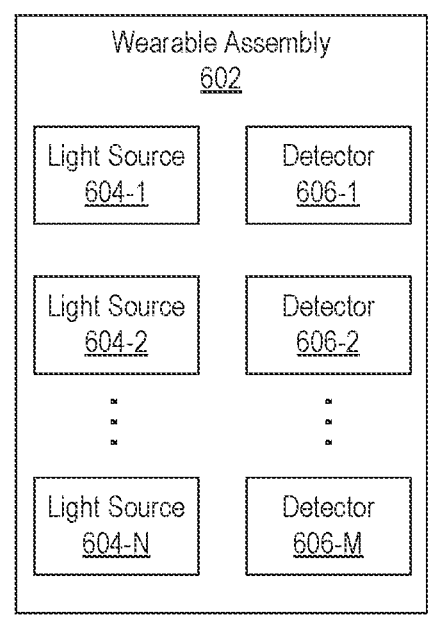
FIG. 6 shows an exemplary optical measurement system.

FIG. 6 shows an exemplary optical measurement system 600 in accordance with the principles described herein. Optical measurement system 600 may be an implementation of optical measurement system 100 and, as shown, includes a wearable assembly 602, which includes N light sources 604 (e.g., light sources 604-1 through 604-N) and M detectors 606 (e.g., detectors 606-1 through 606-M). Optical measurement system 600 may include any of the other components of optical measurement system 100 as may serve a particular implementation. N and M may each be any suitable value (i.e., there may be any number of light sources 604 and detectors 606 included in optical measurement system 600 as may serve a particular implementation).

Light sources 604 are each configured to emit light (e.g., a sequence of light pulses) and may be implemented by any of the light sources described herein. Detectors 606 may each be configured to detect arrival times for photons of the light emitted by one or more light sources 604 after the light is scattered by the target. For example, a detector 606 may include a photodetector configured to generate a photodetector output pulse in response to detecting a photon of the light and a TDC configured to record a timestamp symbol in response to an occurrence of the photodetector output pulse, the timestamp symbol representative of an arrival time for the photon (i.e., when the photon is detected by the photodetector).

Wearable assembly 602 may be implemented by any of the wearable devices, modular assemblies, and/or wearable units described herein. For example, wearable assembly 602 may be implemented by a wearable device (e.g., headgear) configured to be worn on a user's head. Wearable assembly 602 may additionally or alternatively be configured to be worn on any other part of a user's body.

Optical measurement system 600 may be modular in that one or more components of optical measurement system 600 may be removed, changed out, or otherwise modified as may serve a particular implementation. As such, optical measurement system 600 may be configured to conform to three-dimensional surface geometries, such as a user's head. Exemplary modular optical measurement systems comprising a plurality of wearable modules are described in more detail in U.S. patent application Ser. No. 17/176,460, filed Feb. 16, 2021 and issued as U.S. Pat. No. 11,096,620, U.S. patent application Ser. No. 17/176,470, filed Feb. 16, 2021 and published as US2021/0259619A1, U.S. patent application Ser. No. 17/176,487, filed Feb. 16, 2021 and published as US2021/0259632A1, U.S. patent application Ser. No. 17/176,539, filed Feb. 16, 2021 and published as US2021/0259620A1, U.S. patent application Ser. No. 17/176,560, filed Feb. 16, 2021 and published as US2021/0259597A1, and U.S. patent application Ser. No. 17/176,466, filed Feb. 16, 2021 and published as US2021/0263320A1, which applications are incorporated herein by reference in their respective entireties.

Figure 7:
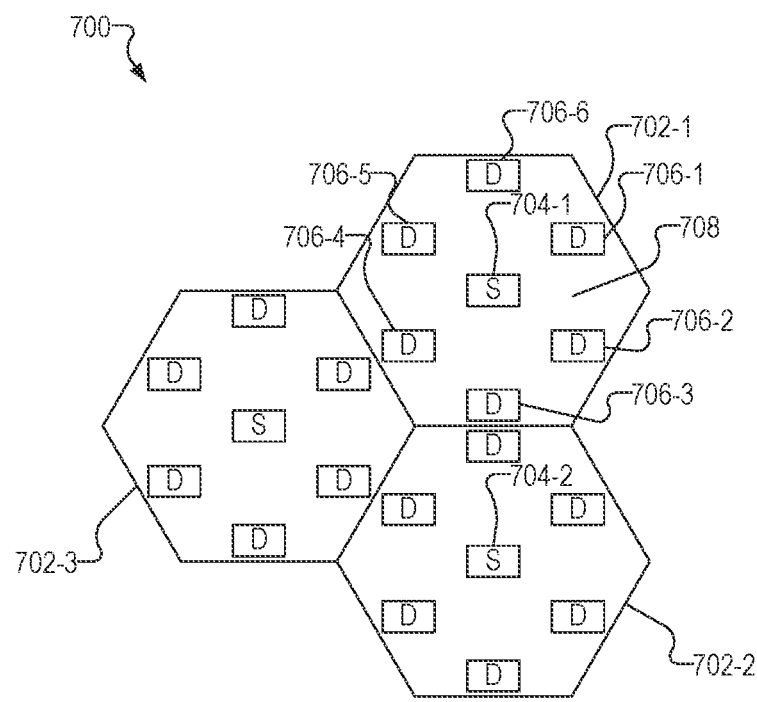
FIG. 7 shows an illustrative modular assembly.

FIG. 7 shows an illustrative modular assembly 700 that may implement optical measurement system 600. Modular assembly 700 is illustrative of the many different implementations of optical measurement system 600 that may be realized in accordance with the principles described herein.

As shown, modular assembly 700 includes a plurality of modules 702 (e.g., modules 702-1 through 702-3). While three modules 702 are shown to be included in modular assembly 700, in alternative configurations, any number of modules 702 (e.g., a single module up to sixteen or more modules) may be included in modular assembly 700.

Each module 702 includes a light source (e.g., light source 704-1 of module 702-1 and light source 704-2 of module 702-2) and a plurality of detectors (e.g., detectors 706-1 through 706-6 of module 702-1). In the particular implementation shown in FIG. 7, each module 702 includes a single light source and six detectors. Each light source is labeled "S" and each detector is labeled "D".

Each light source depicted in FIG. 7 may be implemented by one or more light sources similar to light source 110 and may be configured to emit light directed at a target (e.g., the brain).

Each light source depicted in FIG. 7 may be located at a center region of a surface of the light source's corresponding module. For example, light source 704-1 is located at a center region of a surface 708 of module 702-1. In alternative implementations, a light source of a module may be located away from a center region of the module.

Each detector depicted in FIG. 7 may implement or be similar to detector 104 and may include a plurality of photodetectors (e.g., SPADs) as well as other circuitry (e.g., TDCs), and may be configured to detect arrival times for photons of the light emitted by one or more light sources after the light is scattered by the target.

The detectors of a module may be distributed around the light source of the module. For example, detectors 706 of module 702-1 are distributed around light source 704-1 on surface 708 of module 702-1. In this configuration, detectors 706 may be configured to detect photon arrival times for photons included in light pulses emitted by light source 704-1. In some examples, one or more detectors 706 may be close enough to other light sources to detect photon arrival times for photons included in light pulses emitted by the other light sources. For example, because detector 706-3 is adjacent to module 702-2, detector 706-3 may be configured to detect photon arrival times for photons included in light pulses emitted by light source 704-2 (in addition to detecting photon arrival times for photons included in light pulses emitted by light source 704-1).

In some examples, the detectors of a module may all be equidistant from the light source of the same module. In other words, the spacing between a light source (i.e., a distal end portion of a light source optical conduit) and the detectors (i.e., distal end portions of optical conduits for each detector) are maintained at the same fixed distance on each module to ensure homogeneous coverage over specific areas and to facilitate processing of the detected signals. The fixed spacing also provides consistent spatial (lateral and depth) resolution across the target area of interest, e.g., brain tissue. Moreover, maintaining a known distance between the light source, e.g., light emitter, and the detector allows subsequent processing of the detected signals to infer spatial (e.g., depth localization, inverse modeling) information about the detected signals. Detectors of a module may be alternatively disposed on the module as may serve a particular implementation.

Figure 8A:
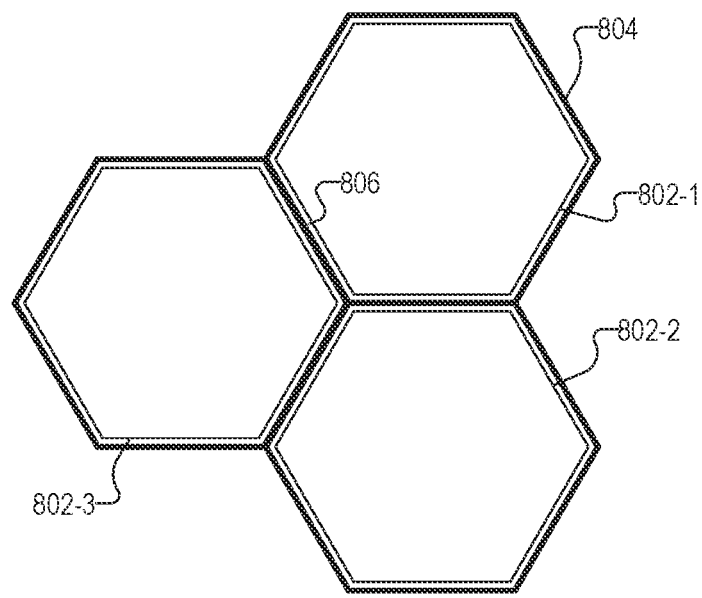
FIGS. 8A-8B show an exemplary implementation of the modular assembly of FIG. 7.
Figure 8B:
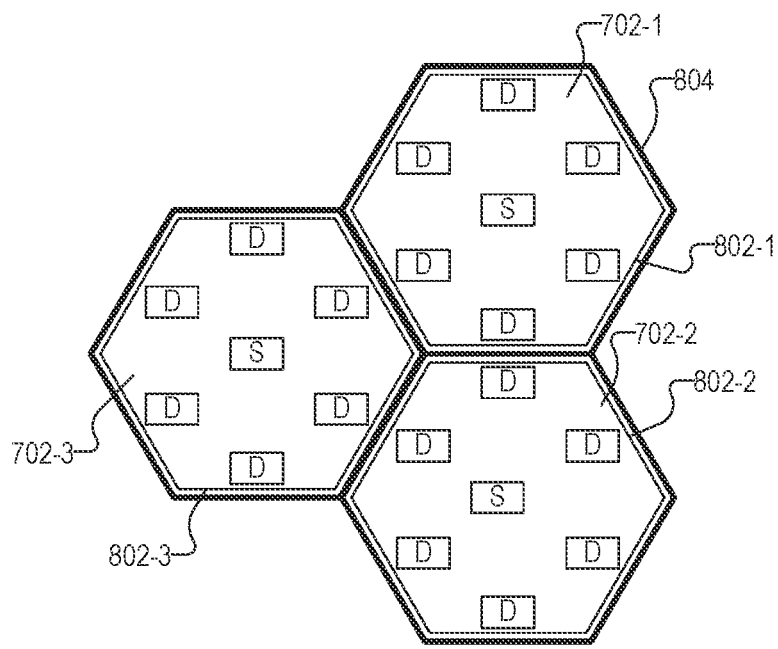

In FIG. 7, modules 702 are shown to be adjacent to and touching one another. Modules 702 may alternatively be spaced apart from one another. For example, FIGS. 8A-8B show an exemplary implementation of modular assembly 700 in which modules 702 are configured to be inserted into individual slots 802 (e.g., slots 802-1 through 802-3, also referred to as cutouts) of a wearable assembly 804. In particular, FIG. 8A shows the individual slots 802 of the wearable assembly 804 before modules 702 have been inserted into respective slots 802, and FIG. 8B shows wearable assembly 804 with individual modules 702 inserted into respective individual slots 802.

Wearable assembly 804 may implement wearable assembly 602 and may be configured as headgear and/or any other type of device configured to be worn by a user.

As shown in FIG. 8A, each slot 802 is surrounded by a wall (e.g., wall 806) such that when modules 702 are inserted into their respective individual slots 802, the walls physically separate modules 702 one from another. In alternative embodiments, a module (e.g., module 702-1) may be in at least partial physical contact with a neighboring module (e.g., module 702-2).

Each of the modules described herein may be inserted into appropriately shaped slots or cutouts of a wearable assembly, as described in connection with FIGS. 8A-8B. However, for ease of explanation, such wearable assemblies are not shown in the figures.

As shown in FIGS. 7 and 8B, modules 702 may have a hexagonal shape. Modules 702 may alternatively have any other suitable geometry (e.g., in the shape of a pentagon, octagon, square, rectangular, circular, triangular, free-form, etc.).

Figure 9:
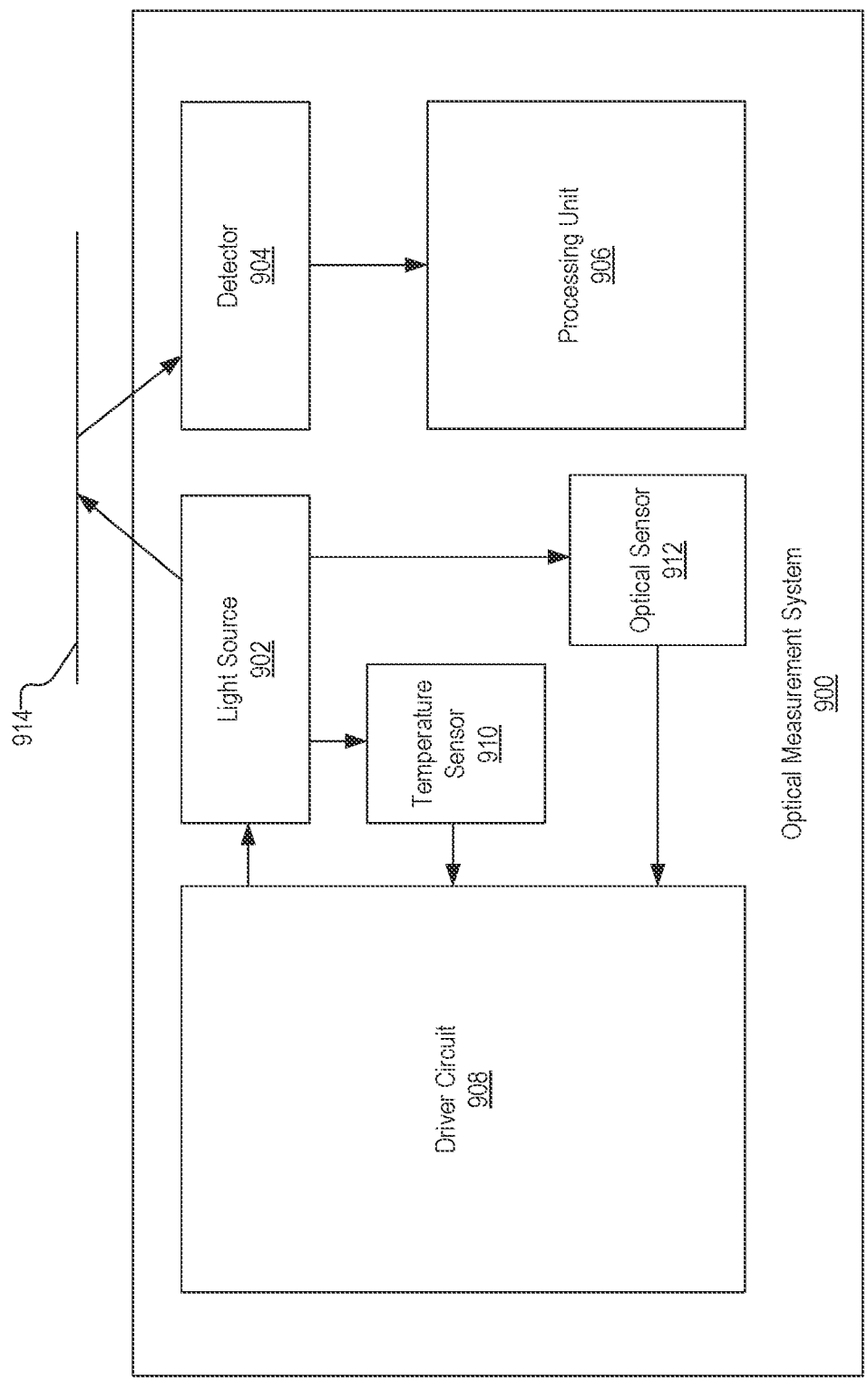
FIGS. 9-13 show exemplary optical measurement systems.

FIG. 9 shows an exemplary optical measurement system 900 that may be similar to and/or implement any of the optical measurement systems described herein. Optical measurement system 900 includes a light source 902 (e.g., an implementation of light source 110), a detector 904 (e.g., an implementation of detector 104), and a processing unit 906. Processing unit 906 may be implemented by processor 108, controller 112, control circuit 204, and/or any other suitable processing and/or computing device or circuit. An exemplary implementation of processing unit 906 is described herein. Optical measurement system 900 further includes a driver circuit 908. Driver circuit 908 may be implemented by controller 112 and/or any other suitable circuit, controller, computing and/or processing device (e.g., processing unit 906). Exemplary implementations of driver circuit 908 are described herein. Optical measurement system 900 further includes a temperature sensor 910 and an optical sensor 912. Temperature sensor 910 may be thermally coupled to light source 902. In some examples, optical sensor 912 may additionally be thermally coupled to temperature sensor 910 and light source 902.

Light source 902 may be configured to direct light (e.g., light pulses) at a target 914 (e.g., body 102). Detector 904 may be configured to detect photons of the light emitted by light source 902 after the light is scattered by target 914. Detector 904 may detect arrival times of the photons at detector 904 and provide output data to processing unit 906 indicating the arrival times. Processing unit 906 may generate, based on the arrival times, histogram data (e.g., TPSF 402) associated with target 914. Processing unit 906 may determine, based on the histogram data, an optical property associated with target 914.

Driver circuit 908 may be configured to drive light source 902 by providing an input current (e.g., an injection current) for light source 902. The input current may affect an optical power level of the light emitted by light source 902. For instance, the optical power level of the light may be dependent on (e.g., proportional to) the input current. Additionally, the optical power level of the light may be further dependent on a temperature of light source 902. For instance, the temperature of light source 902 may affect the proportionality of the dependence of the optical power level on the input current. Thus, the optical power level of the light may be a function of the input current and the temperature. Consequently, for a particular optical power level, the level of input current that is to be provided by driver circuit 908 may vary based on the temperature of light source 902. The relationship between the temperature, input current, and output optical power may be known for a particular implementation of light source 902 and/or determined in any suitable manner (e.g., measured and recorded in a controlled environment).

Temperature sensor 910 may be configured to output a temperature signal representative of the temperature of light source 902. Temperature sensor 910 may detect the temperature of light source 902 in any suitable manner. Driver circuit 908 may receive the temperature signal and determine the input current level to be provided to light source 902 based on the temperature (represented by the temperature signal) so that light source 902 outputs a particular optical power level. The particular optical power level may be any suitable power level. In some examples, the particular optical power level may vary, for instance, based on the temperature. For example, characteristics (e.g., sensitivity, responsivity, etc.) of detector 904 may also be dependent on the temperature of detector 904. As a result, the particular optical power level output by light source 902 may also be based on the temperature signal provided by temperature sensor 910. Temperature sensor 910 may be implemented by any suitable sensor configured to determine temperature, such as a thermocouple, a thermistor, or any other suitable temperature sensor.

Optical sensor 912 may be configured to output a power signal representative of the optical power level of the light emitted by light source 902. Driver circuit 908 may receive the power signal and determine the input current level to be provided to light source 902 based on the measured optical power level. As the input current may be selected for a particular optical power level, the power signal may provide feedback to driver circuit 908 to determine how the input current is to be adjusted so that the measured optical power level output by light source 902 matches the particular optical power level. Optical sensor 912 may be implemented by any suitable sensor configured to measure the optical power of light source 902, such as a photodiode, a photoconductor, or any other suitable optical sensor.

Driver circuit 908 may determine the input current based on either or both the temperature signal provided by temperature sensor 910 and the power signal provided by optical sensor 912. For instance, the temperature signal may be used in a feedforward loop, so that the measured temperature of light source 902 may be used to adjust the input current level to be provided for the particular output optical power level. In an ideally calibrated system, this feedforward loop may precisely provide the input current level for the particular output optical power level. Thus, in such circumstances, the input current level may be determined based on only the temperature signal.

However, in other circumstances, an input current level determined based only on the temperature signal may not result in the particular output optical power level. For example, as components of optical measurement system 900 age, the dependency of output optical power on temperature and input current may change. Thus, driver circuit 908 may further base the input current on the power signal provided by optical sensor 912. For example, the power signal may be used in a feedback loop, so that the measured optical power level may be used to adjust the input current level provided so that the measured optical power level matches the particular optical power level.

Additionally, the optical power level as measured by optical sensor 912 may also be dependent on factors such as temperature. For instance, as temperature increases, sensitivity of optical sensor 912 may decrease, resulting in a skewed measurement of the optical power level. In response, driver circuit 908 may determine, based on the power signal and the temperature signal, an actual power level of the light emitted by light source 902. Driver circuit 908 may use this actual power level in the feedback loop to adjust input current provided to light source 902. Driver circuit 908 may determine the actual power level in any suitable manner. For example, thermal characteristics of a particular implementation of optical sensor 912 may be known and/or determined (e.g., measured and recorded in a controlled environment). Based on the thermal characteristics, driver circuit 908 may determine an inverse dependency of the actual power level based on the measured optical power level and the temperature. Additionally or alternatively, driver circuit 908 may include a lookup table that provides actual power levels based on measured optical power levels and temperatures. Based on the actual power level and the temperature, driver circuit 908 may output the input current to light source 902.

Figure 10:
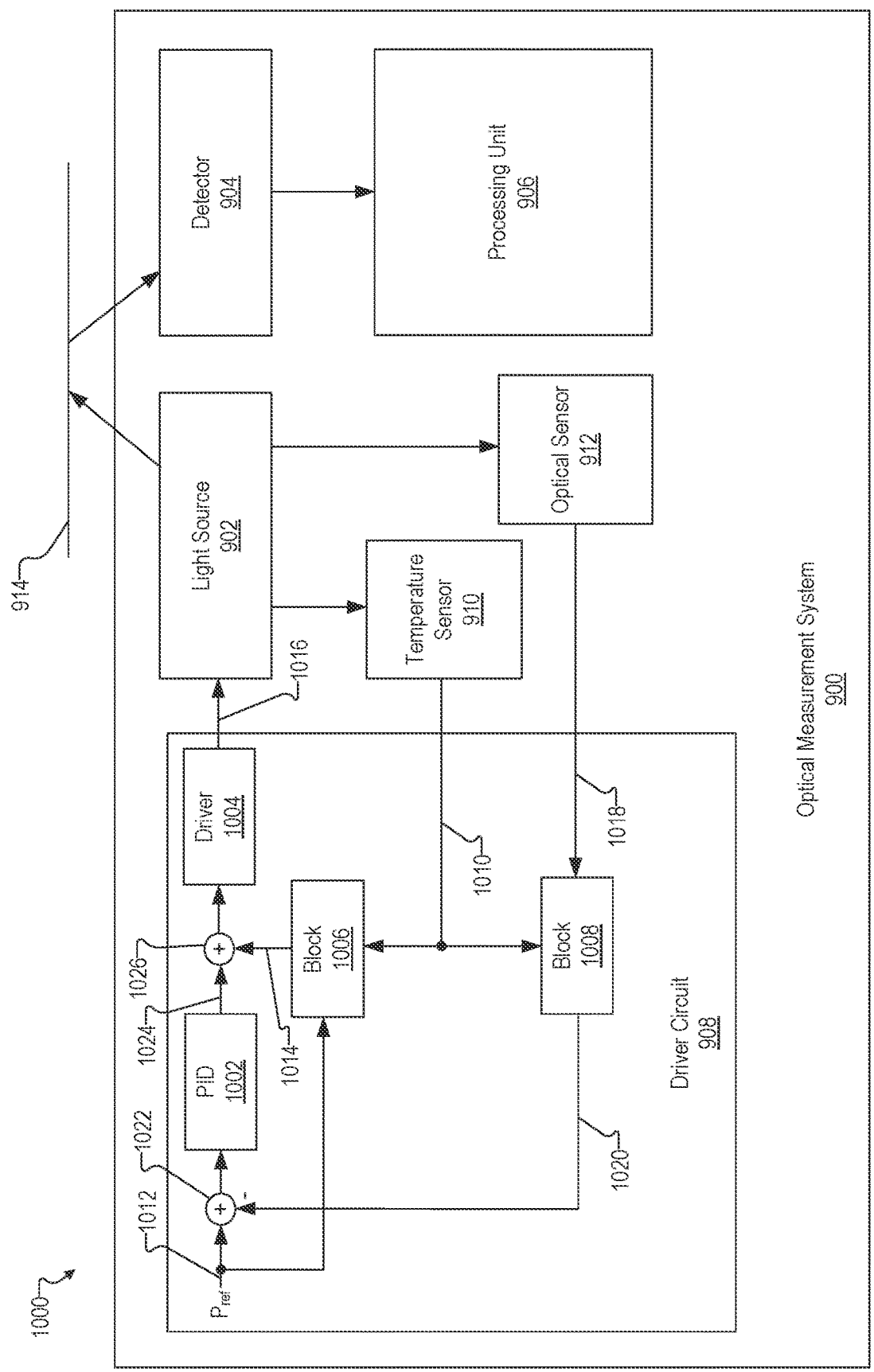

FIG. 10 illustrates an exemplary configuration 1000 of optical measurement system 900. Specifically, configuration 1000 shows an exemplary configuration of driver circuit 908. In configuration 1000, driver circuit 908 includes a proportional-integral-derivative (PID) controller 1002, a laser driver 1004, a feedforward function block 1006 ("feedforward block 1006") and a feedback function block 1008 ("feedback block 1008"). PID controller 1002 and laser driver 1004 may each be implemented by any suitable circuit, controller, computing and/or processing device.

Feedforward block 1006 may receive from temperature sensor 910 a temperature signal 1010 representative of a temperature of light source 902. Feedforward block 1006 may further receive a reference power 1012, such as from a power source configured to provide power for optical measurement system 900. Feedforward block 1006 may be configured to generate a feedforward current 1014 based on a power level of reference power 1012 and temperature signal 1010. Feedforward current 1014 may be received by driver 1004 and used as a basis for an input current 1016. As described, an optical power level of light emitted by light source 902 may depend on a current level of input current 1016.

Feedforward block 1006 may adjust, based on temperature signal 1010, reference power 1012 to generate feedforward current 1014 having an appropriate current level for the particular optical power level. Feedforward block 1006 may determine the appropriate current level in any suitable manner. For instance, optical characteristics of light source 902 may be known and/or determined. Feedforward block 1006 may determine, based on the optical characteristics, appropriate current levels for each temperature and particular optical power level. For example, feedforward block 1006 may include data representative of a lookup table that provides the appropriate current level based on temperature signal 1010 and the particular optical power level. Based on the appropriate current level, feedforward block 1006 may adjust reference power 1012 accordingly.

Feedback block 1008 may also receive from temperature sensor 910 temperature signal 1010. Feedback block 1008 may further receive from optical sensor 912 a power signal 1018 representative of the optical power level of the light emitted by light source 902 as measured by optical sensor 912. Feedback block 1008 may adjust power signal 1018 based on temperature signal 1010 to determine an actual power level of the optical power of the light emitted by light source 902. As described, the measured power level of power signal 1018 may be skewed based on the temperature (represented by temperature signal 1010) and thermal characteristics of optical sensor 912. Thus, feedback block 1008 may determine the actual power level and output an actual power signal 1020 representing the actual power level.

Driver circuit 908 may incorporate the feedback provided by feedback block 1008 in any suitable manner. For instance, driver circuit 908 may adjust reference power 1012 based on actual power signal 1020 by subtracting actual power signal 1020 from reference power 1012, as depicted by sum block 1022 that adds a negated actual power signal 1020 to reference power 1012. PID controller 1002 may then generate a difference current 1024 that corresponds to the power level difference between reference power 1012 and actual power signal 1020. Driver circuit 908 may then add difference current 1024 to feedforward current 1014 to adjust feedforward current 1014 based on the optical power level of the light emitted by light source 902. The adding of difference current 1024 to feedforward current 1014 is depicted by sum block 1026, producing a current with the appropriate current level for input current 1016.

Figure 11:
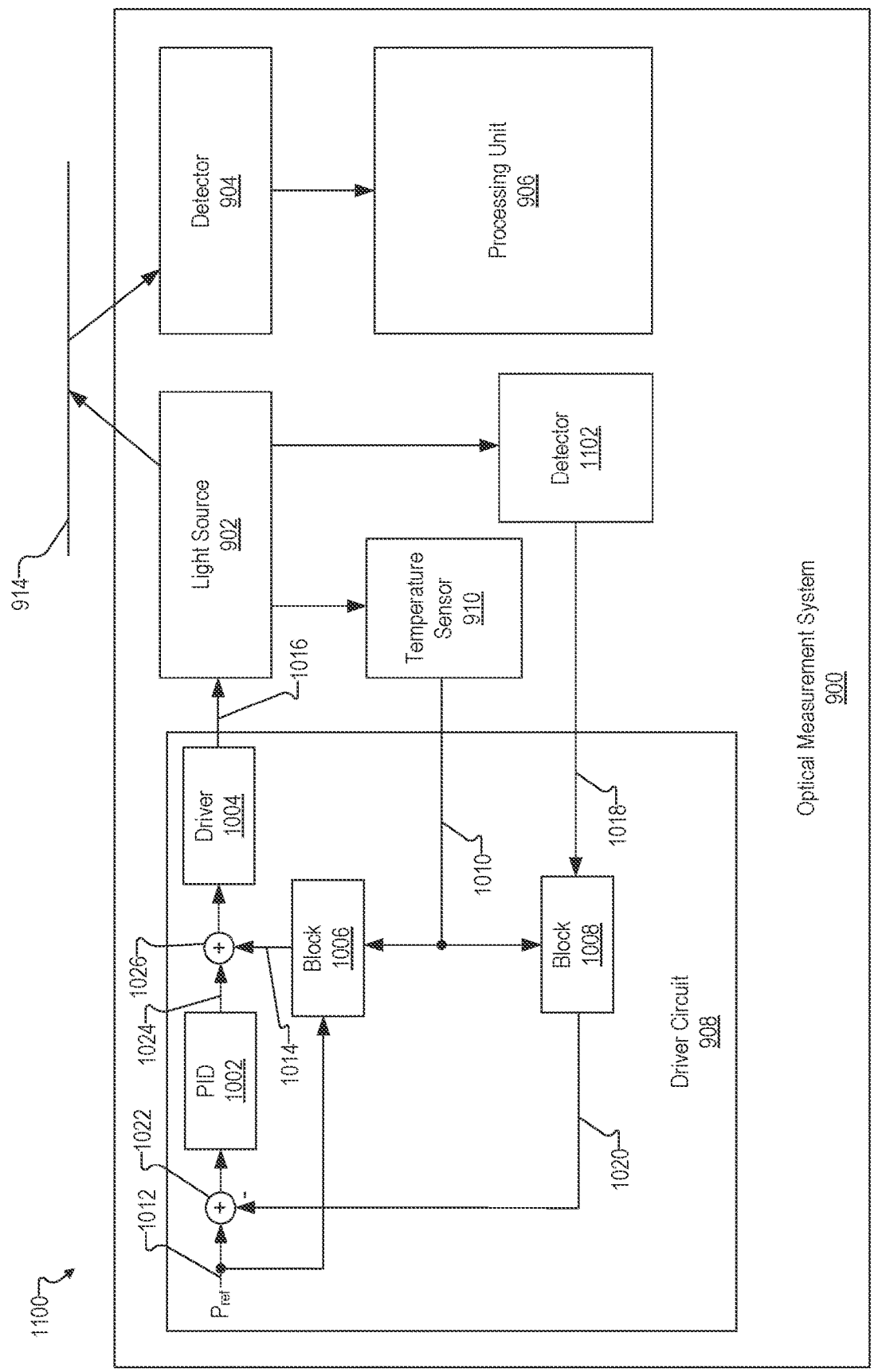

FIG. 11 illustrates another exemplary configuration 1100 of optical measurement system 900. Configuration 1100 may be similar to configuration 1000, except optical sensor 912 may be implemented with a detector 1102 (e.g., an implementation of detector 104, an implementation of SPAD circuit 202, etc.).

Detector 1102 may be a dedicated detector paired with light source 902. In some examples, detector 1102 may be paired with light source 902 and other light sources of optical measurement system 900 (not shown). Output of detector 1102 may be processed so that detector 1102 is configured to function as optical sensor 912, measuring an optical power level of light emitted by light source 902. Additionally, detector 1102 may be further configured to measure an instrument response function (IRF) of light source 902, as detector 1102 may be configured to directly receive light emitted from light source 902. The IRF may be used to update calibration of optical measurement system 900 and/or improve measurements of an optical property of target 914. In some examples, detector 1102 may be configured to determine the optical power level and/or the IRF at a lower frequency than the measurements of detector 904. Output of detector 1102 may be processed to perform these functions in any suitable manner, such as using signal processing blocks that determine a total count of detected photons with an optional low pass filter.

Additionally or alternatively, light source 902 may operate in a pulsed mode, with a constant amplitude but with a variable pulse width. In such instances, the optical power level of light emitted by light source 902 may be determined using a full width half maximum (FWHM) of the IRF. Thus, detector 1102 may be configured to operate as optical sensor 912 by processing output of detector 1102 with an FWHM calculation block and an optional low pass filter.

Figure 12:
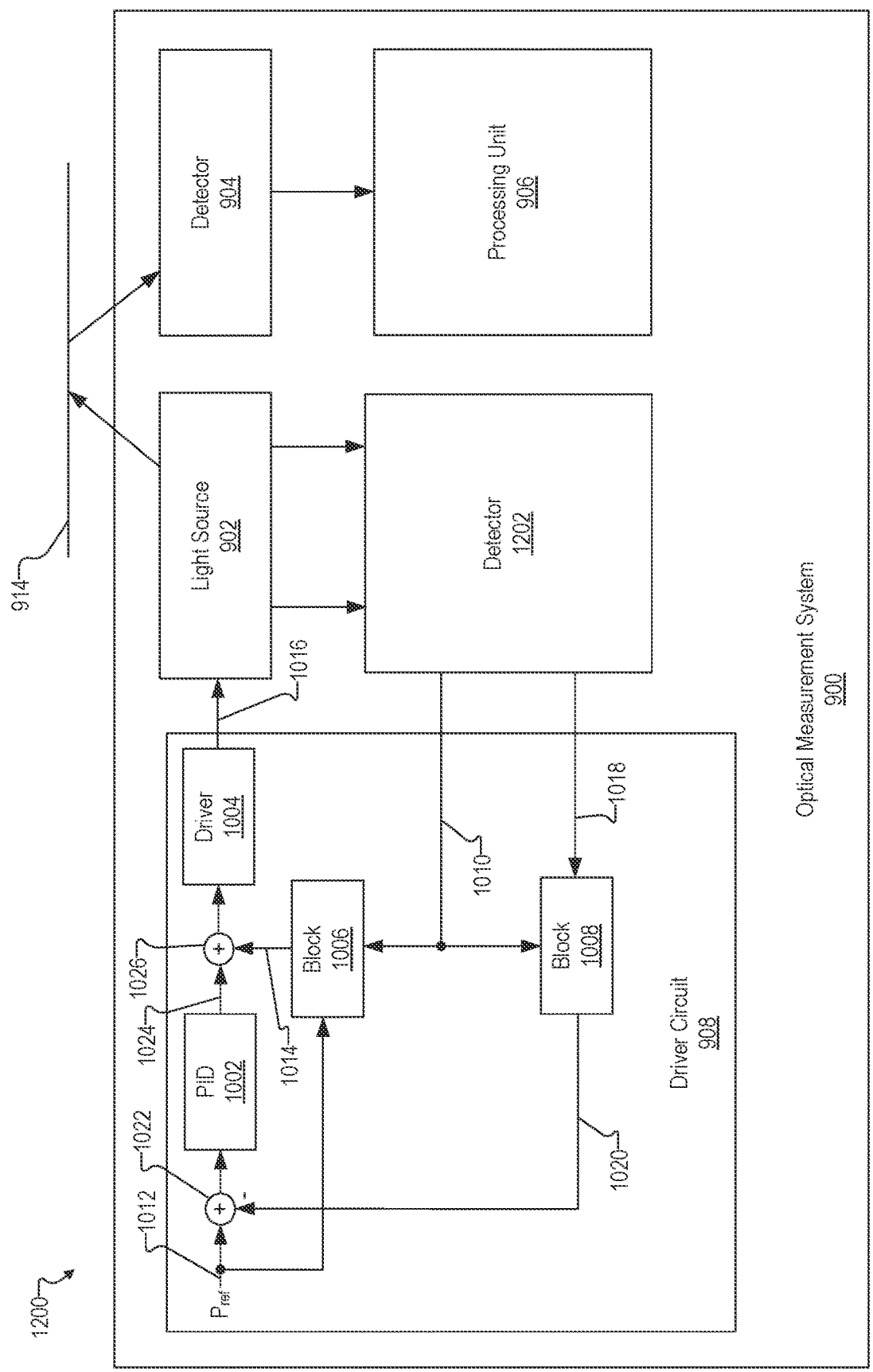

FIG. 12 illustrates another exemplary configuration 1200 of optical measurement system 900. Configuration 1200 may be similar to configuration 1100, except a detector 1202 may be configured to function as both optical sensor 912 and temperature sensor 910. Detector 1202 may operate as optical sensor 912 similar to detector 1102. Detector 1202 may be further configured to operate additionally as temperature sensor 910 by being placed in close proximity to light source 902. As in configuration 1100, detector 1202 may further be configured to measure IRFs of light source 902.

Figure 13:
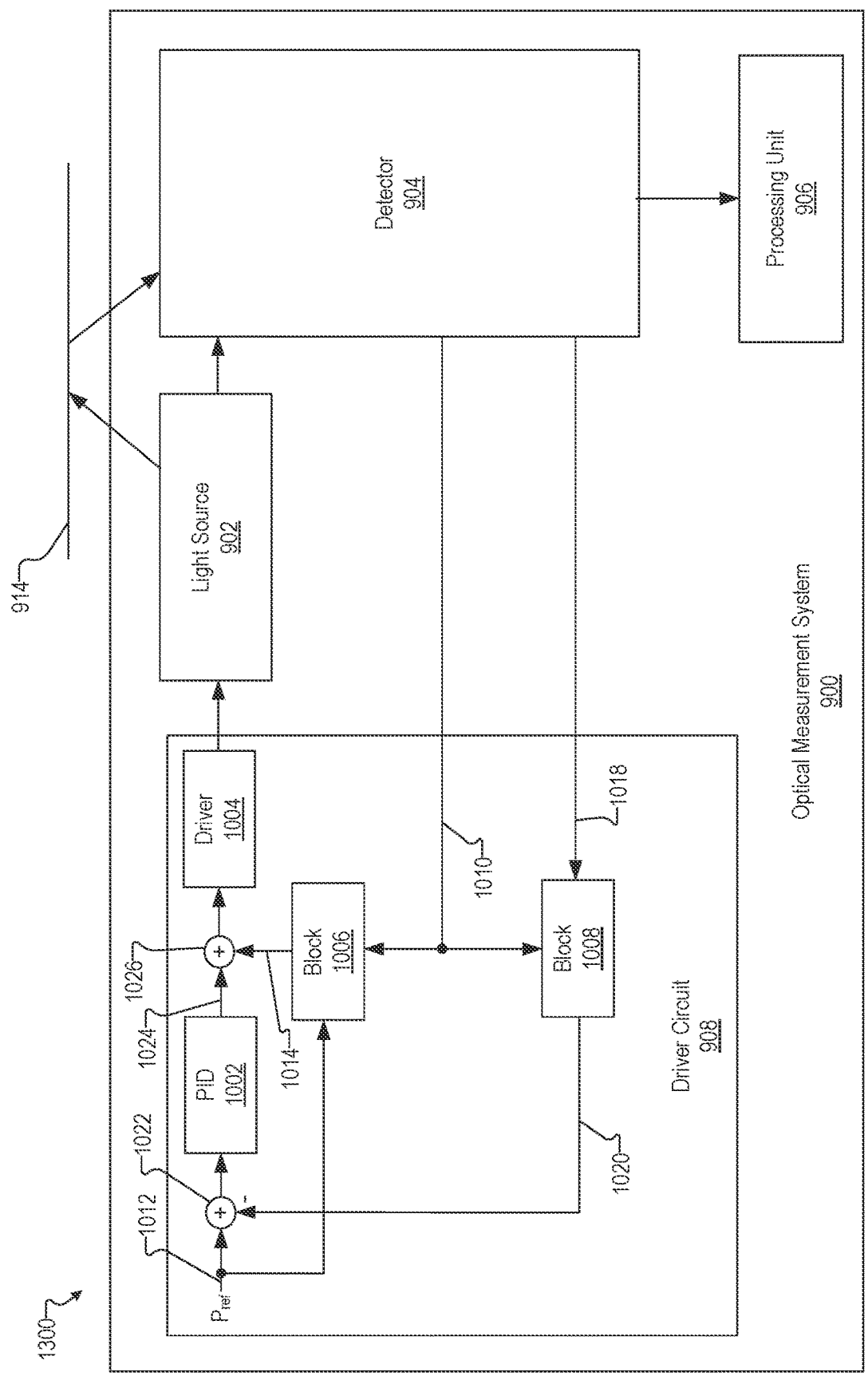

FIG. 13 illustrates another exemplary configuration 1300 of optical measurement system 900. Configuration 1300 may be similar to configuration 1200, except detector 1202 may be implemented by detector 904. Thus, a separate detector may not be needed for measuring temperature and/or optical power levels. Rather, detector 904 may be configured to operate as temperature sensor 910 and/or optical sensor 912 during a calibration period. For instance, during the calibration period, light source 902 may be configured to emit light directly at detector 904. Detector 904 may determine, based on the light directed at detector 904, an optical power level of the light, a temperature of light source 902, and/or an IRF of light source 902. Then, outside the calibration period, such as during a measurement period, light source 902 may be configured to emit light directed at target 914 and detector 904 may be configured to detect arrival times of photons of the light after the light is scattered by target 914 for determining an optical property of target 914.

Figure 14:
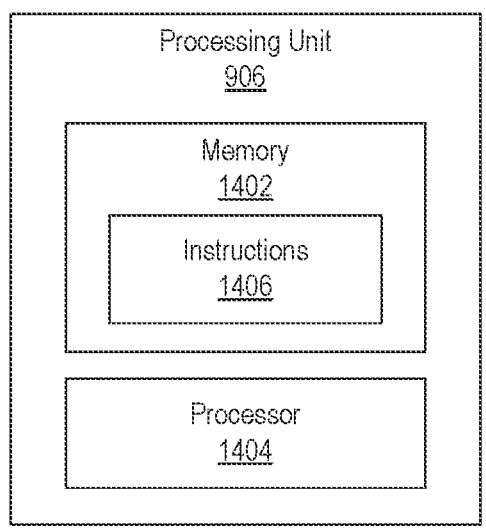
FIG. 14 illustrates an exemplary implementation of a processing unit.

FIG. 14 illustrates an exemplary implementation of processing unit 906 in which processing unit 906 includes a memory 1402 and a processor 1404 configured to be selectively and communicatively coupled to one another. In some examples, memory 1402 and processor 1404 may be distributed between multiple devices and/or multiple locations as may serve a particular implementation.

Memory 1402 may be implemented by any suitable non-transitory computer-readable medium and/or non-transitory processor-readable medium, such as any combination of non-volatile storage media and/or volatile storage media. Exemplary non-volatile storage media include, but are not limited to, read-only memory, flash memory, a solid-state drive, a magnetic storage device (e.g., a hard drive), ferroelectric random-access memory ("RAM"), and an optical disc. Exemplary volatile storage media include, but are not limited to, RAM (e.g., dynamic RAM).

Memory 1402 may maintain (e.g., store) executable data used by processor 1404 to perform one or more of the operations described herein. For example, memory 1402 may store instructions 1406 that may be executed by processor 1404 to perform any of the operations described herein. Instructions 1406 may be implemented by any suitable application, program (e.g., sound processing program), software, code, and/or other executable data instance. Memory 1402 may also maintain any data received, generated, managed, used, and/or transmitted by processor 1404.

Processor 1404 may be configured to perform (e.g., execute instructions 1406 stored in memory 1402 to perform) various operations described herein. For example, processor 1404 may be configured to perform any of the operations described herein as being performed by processing unit 906.

In some examples, processing unit 906 may be included in the same wearable system (e.g., a head-mountable component) that includes light source 902 and detector 904. Alternatively, processing unit 906 is not included in the same wearable system that includes light source 902 and detector 904.

To illustrate, processing unit 906 may be included in a wearable device separate from a head-mountable component that includes light source 902 and detector 904. For example, processing unit 906 may be included in a wearable device configured to be worn off the head while the head-mountable component is worn on the head. In these examples, one or more communication interfaces (e.g., cables, wireless interfaces, etc.) may be used to facilitate communication between the head-mountable component and the separate wearable device.

Additionally or alternatively, processing unit 906 may be remote from the user (i.e., not worn by the user). For example, processing unit 906 may be implemented by a stand-alone computing device communicatively coupled the head-mountable component by way of one or more communication interfaces (e.g., cables, wireless interfaces, etc.).

FIGS. 15-20 illustrate embodiments of a wearable device 1500 that includes elements of the optical detection systems described herein. In particular, the wearable devices 1500 shown in FIGS. 15-20 include a plurality of modules 1502, similar to the modules described herein. For example, each module 1502 may include a light source (e.g., light source 704-1) and a plurality of detectors (e.g., detectors 706-1 through 706-6). The wearable devices 1500 may each also include a controller (e.g., controller 112) and a processor (e.g., processor 108) and/or be communicatively connected to a controller and processor. In general, wearable device 1500 may be implemented by any suitable headgear and/or clothing article configured to be worn by a user. The headgear and/or clothing article may include batteries, cables, and/or other peripherals for the components of the optical measurement systems described herein.

Figure 15:
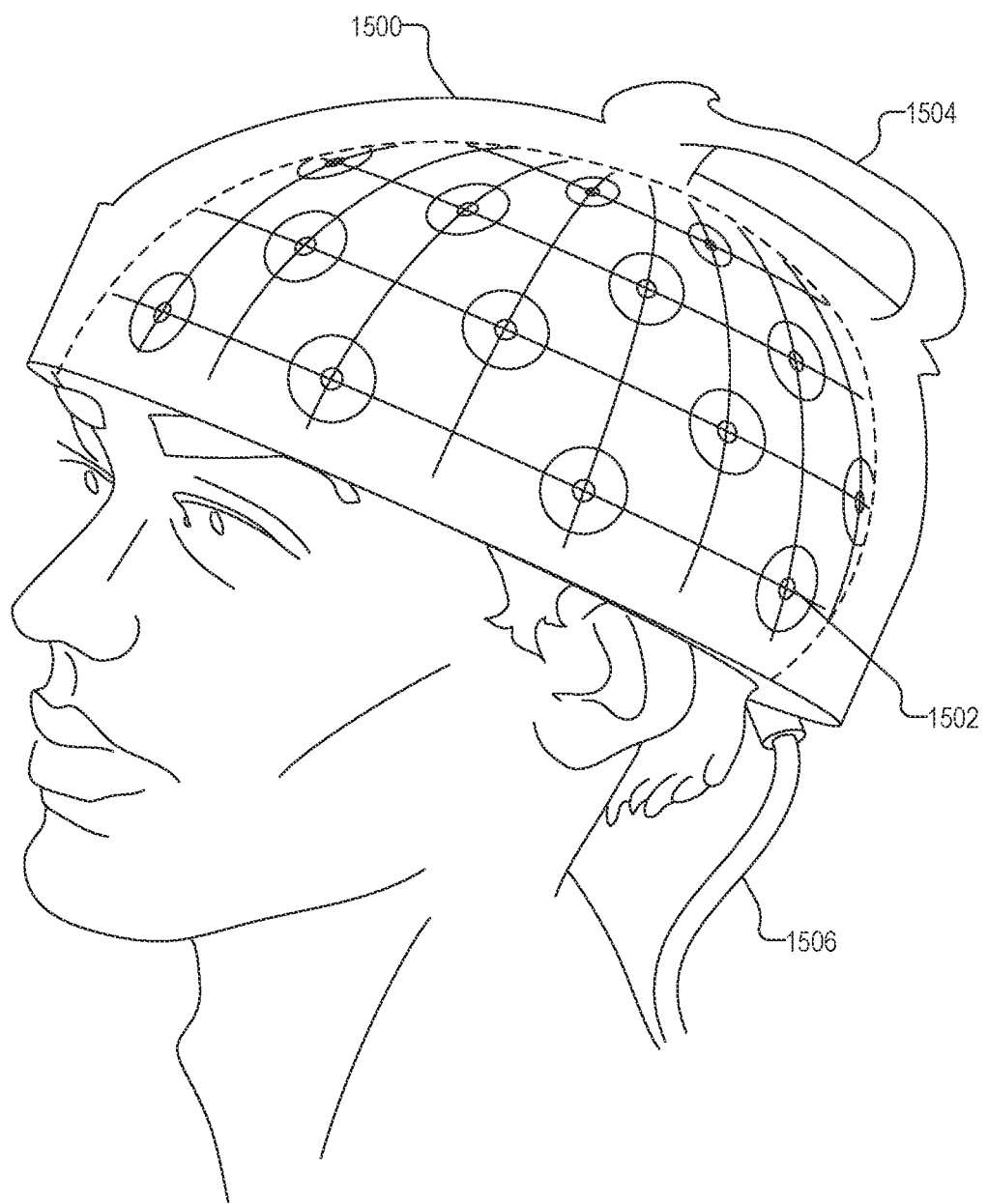
FIGS. 15-20 illustrate embodiments of a wearable device that includes elements of the optical detection systems described herein.
Figure 16:
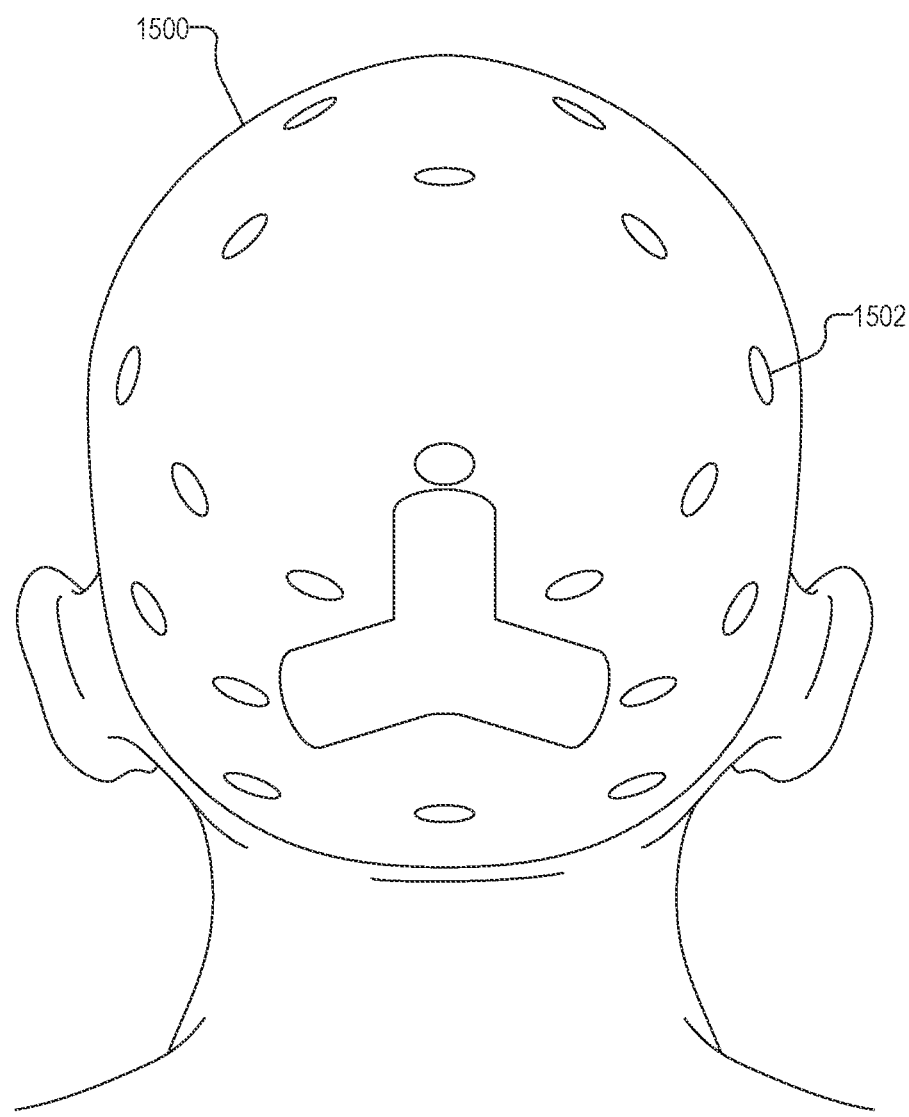
Figure 17:
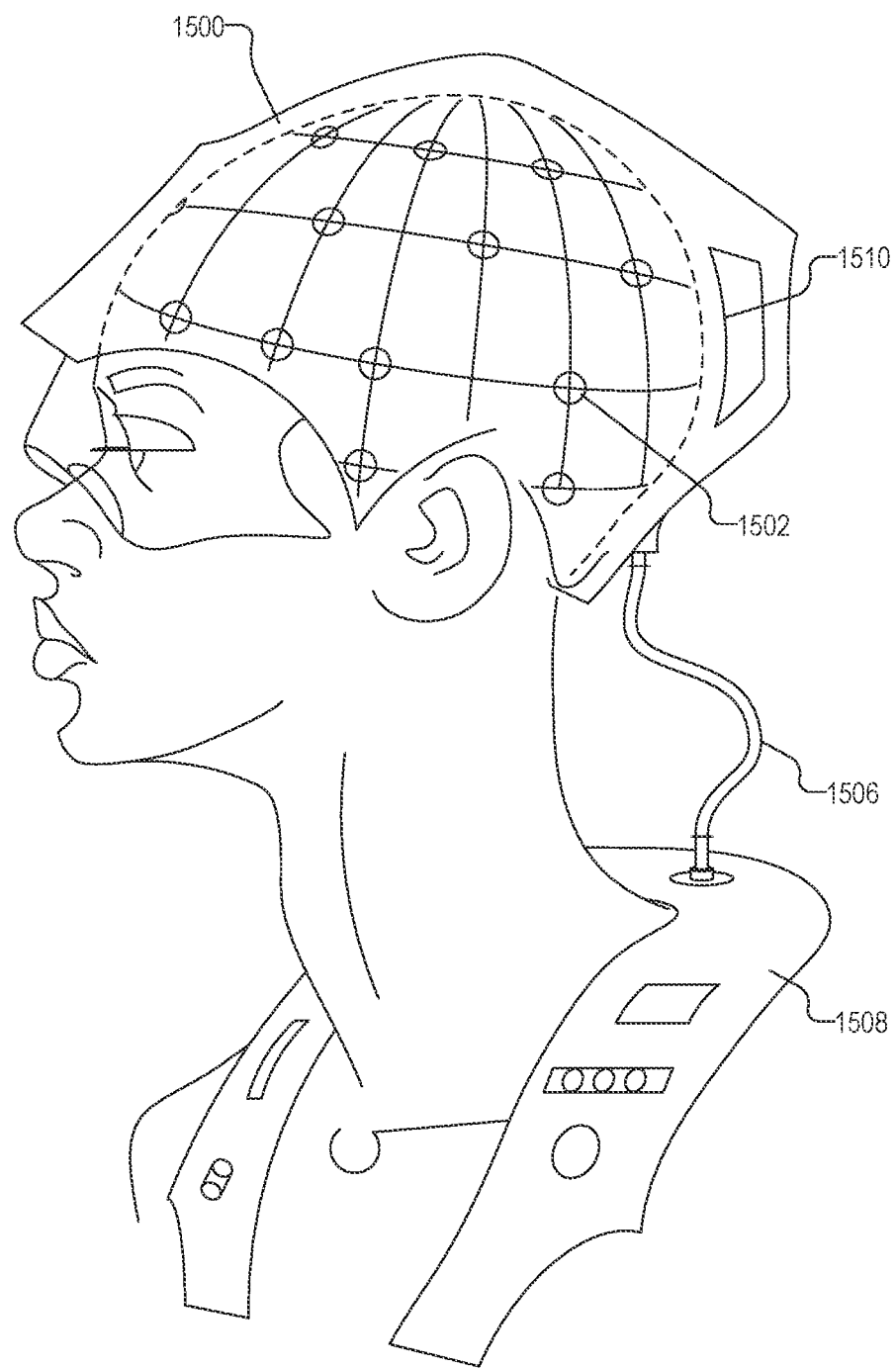

FIG. 15 illustrates an embodiment of a wearable device 1500 in the form of a helmet with a handle 1504. A cable 1506 extends from the wearable device 1500 for attachment to a battery or hub (with components such as a processor or the like). FIG. 16 illustrates another embodiment of a wearable device 1500 in the form of a helmet showing a back view. FIG. 17 illustrates a third embodiment of a wearable device 1500 in the form of a helmet with the cable 1506 leading to a wearable garment 1508 (such as a vest or partial vest) that can include a battery or a hub. Alternatively or additionally, the wearable device 1500 can include a crest 1510 or other protrusion for placement of the hub or battery.

Figure 18:
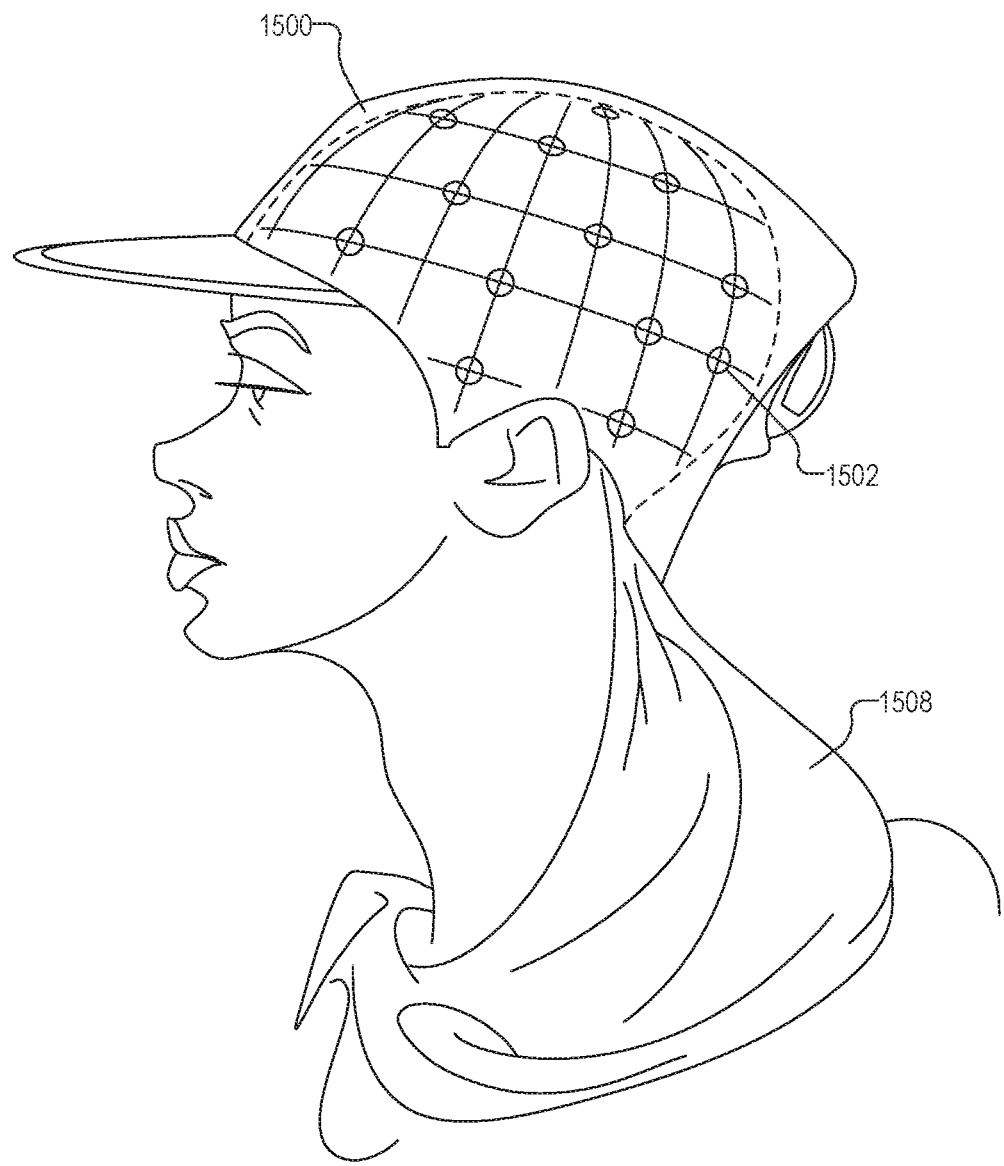
Figure 19:
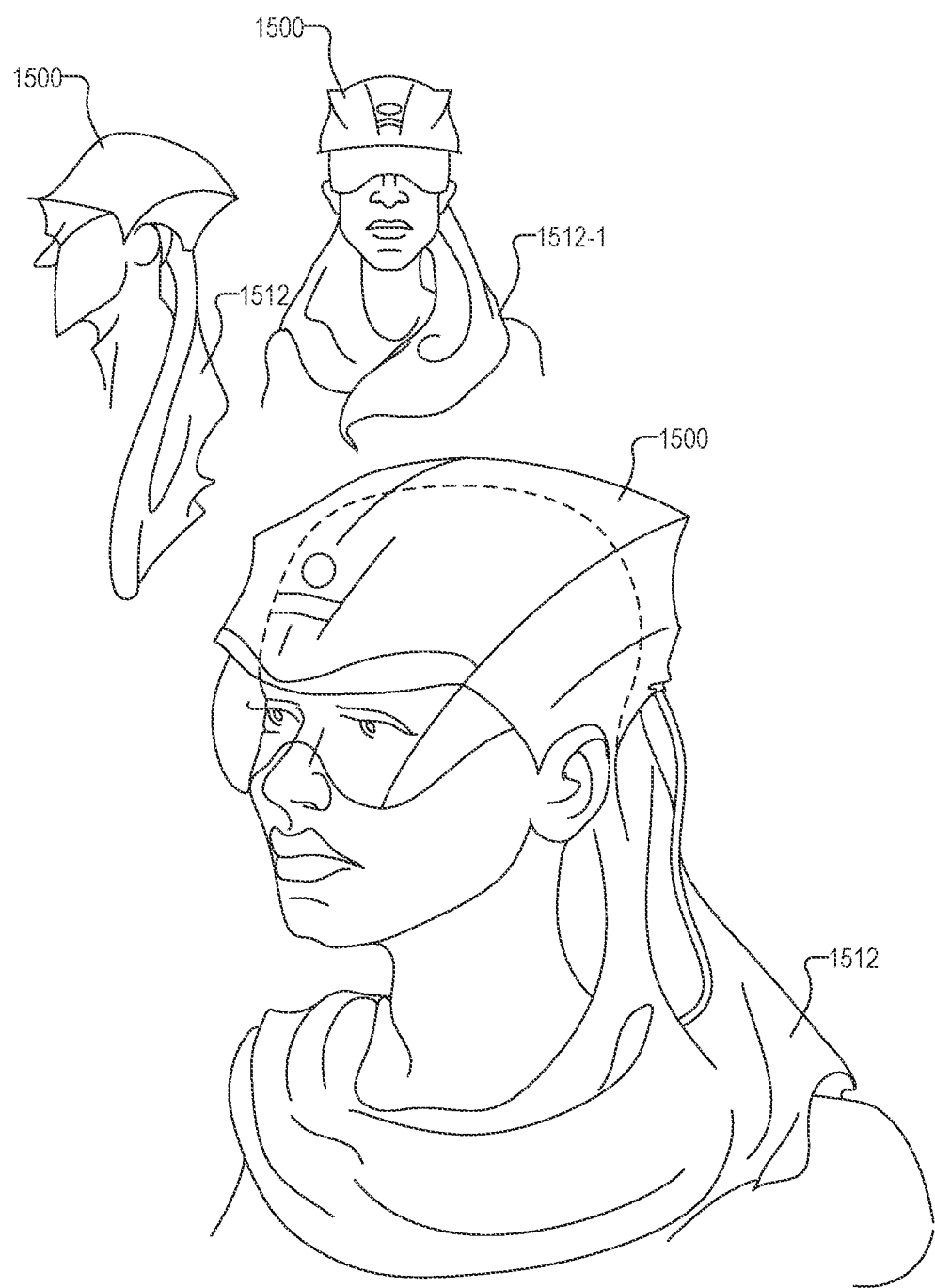
Figure 20:
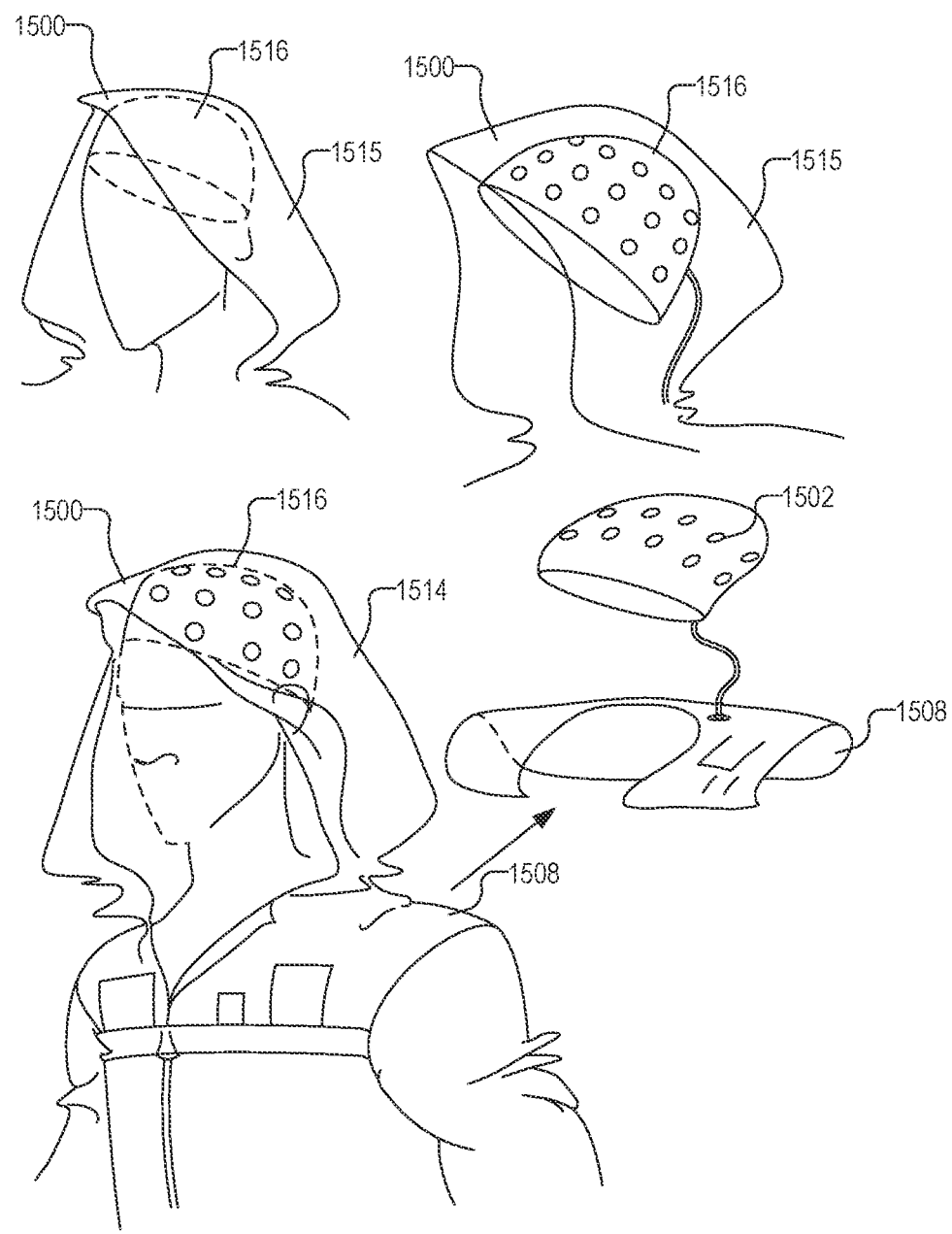

FIG. 18 illustrates another embodiment of a wearable device 1500 in the form of a cap with a wearable garment 1508 in the form of a scarf that may contain or conceal a cable, battery, and/or hub. FIG. 19 illustrates additional embodiments of a wearable device 1500 in the form of a helmet with a one-piece scarf 1512 or two-piece scarf 1512-1. FIG. 20 illustrates an embodiment of a wearable device 1500 that includes a hood 1514 and a beanie 1516 which contains the modules 1502, as well as a wearable garment 1508 that may contain a battery or hub.

Figure 21:
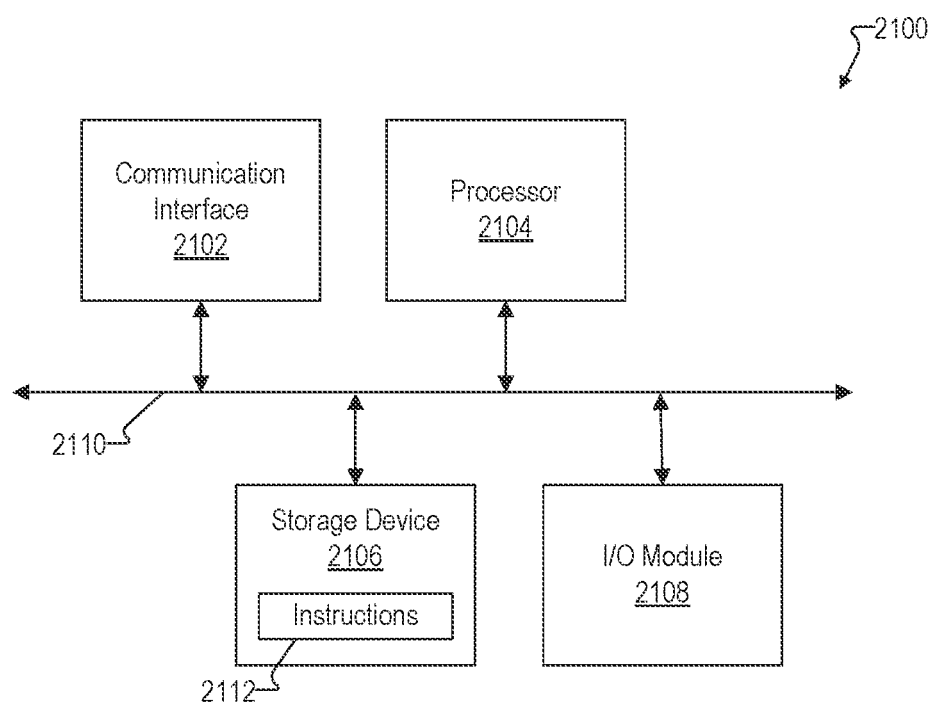
FIG. 21 illustrates an exemplary computing device.

FIG. 21 illustrates an exemplary computing device 2100 that may be specifically configured to perform one or more of the processes described herein. Any of the systems, units, computing devices, and/or other components described herein may be implemented by computing device 2100.

As shown in FIG. 21, computing device 2100 may include a communication interface 2102, a processor 2104, a storage device 2106, and an input/output ("I/O") module 2108 communicatively connected one to another via a communication infrastructure 2110. While an exemplary computing device 2100 is shown in FIG. 21, the components illustrated in FIG. 21 are not intended to be limiting. Additional or alternative components may be used in other embodiments. Components of computing device 2100 shown in FIG. 21 will now be described in additional detail.

Communication interface 2102 may be configured to communicate with one or more computing devices. Examples of communication interface 2102 include, without limitation, a wired network interface (such as a network interface card), a wireless network interface (such as a wireless network interface card), a modem, an audio/video connection, and any other suitable interface.

Processor 2104 generally represents any type or form of processing unit capable of processing data and/or interpreting, executing, and/or directing execution of one or more of the instructions, processes, and/or operations described herein. Processor 2104 may perform operations by executing computer-executable instructions 2112 (e.g., an application, software, code, and/or other executable data instance) stored in storage device 2106.

Storage device 2106 may include one or more data storage media, devices, or configurations and may employ any type, form, and combination of data storage media and/or device as described herein. Electronic data, including data described herein, may be temporarily and/or permanently stored in storage device 2106. For example, data representative of computer-executable instructions 2112 configured to direct processor 2104 to perform any of the operations described herein may be stored within storage device 2106. In some examples, data may be arranged in one or more databases residing within storage device 2106.

I/O module 2108 may include one or more I/O modules configured to receive user input and provide user output. I/O module 2108 may include any hardware, firmware, software, or combination thereof supportive of input and output capabilities. For example, I/O module 2108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 2108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 2108 is configured to provide graphical data to a display for presentation to a user. The graphical data may be representative of one or more graphical user interfaces and/or any other graphical content as may serve a particular implementation.

Figure 22:
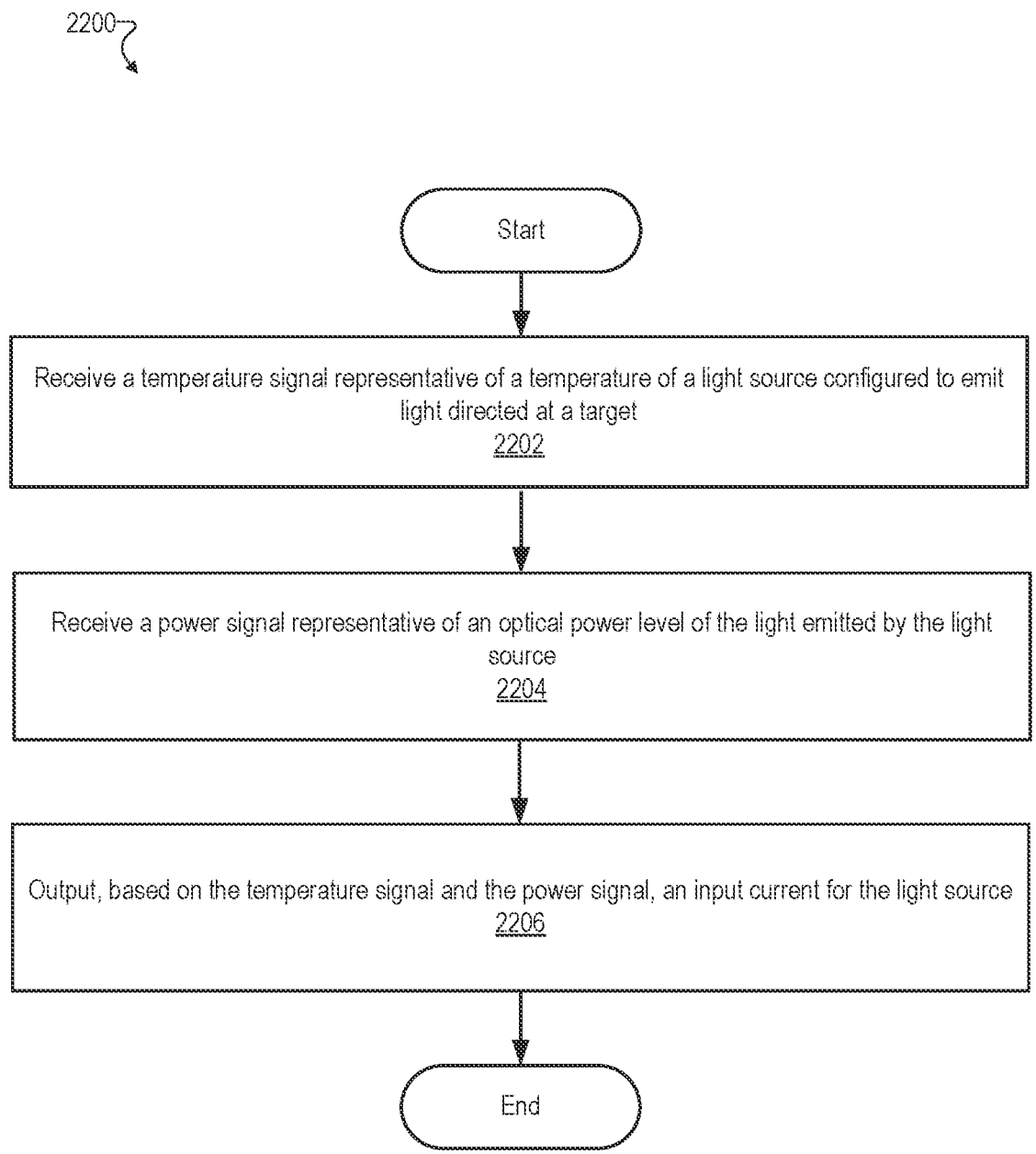
FIG. 22 illustrates an exemplary method.

FIG. 22 illustrates an exemplary method 2200 that may be performed by driver circuit 908 and/or any implementation thereof. While FIG. 22 illustrates exemplary operations according to one embodiment, other embodiments may omit, add to, reorder, and/or modify any of the operations shown in FIG. 22. Each of the operations shown in FIG. 22 may be performed in any of the ways described herein.

At operation 2202, a driver circuit receives a temperature signal representative of a temperature of a light source configured to emit light directed at a target.

At operation 2204, the driver circuit receives a power signal representative of an optical power level of the light emitted by the light source.

At operation 2206, the driver circuit outputting, based on the temperature signal and the power signal, an input current for the light source.

An illustrative optical measurement system includes a light source configured to emit light directed at a target. The optical measurement system further includes a detector configured to detect arrival times for photons of the light after the light is scattered by the target. The optical measurement system further includes a temperature sensor configured to output a temperature signal representative of a temperature of the light source. The optical measurement system further includes an optical sensor configured to output a power signal representative of an optical power level of the light emitted by the light source. The optical measurement system further includes a driver circuit configured to output, based on the temperature signal and the power signal, an input current for the light source. An illustrative wearable system for use by a user includes a component configured to be attached to a body of the user. The component includes a light source configured to emit light directed at a target within the body. The component further includes an array of photodetectors configured to detect photons of light after the light reflects off the target. The component further includes a temperature sensor configured to output a temperature signal representative of a temperature of the light source. The component further includes an optical sensor configured to output a power signal representative of an optical power level of the light emitted by the light source. The component further includes a driver circuit configured to output, based on the temperature signal and the power signal, an input current for the light source.

An illustrative method includes receiving, by a driver circuit, a temperature signal representative of a temperature of a light source configured to emit light directed at a target. The method further includes receiving, by the driver circuit, a power signal representative of an optical power level of the light emitted by the light source. The method further includes outputting, by the driver circuit, based on the temperature signal and the power signal, an input current for the light source.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. An optical measurement system comprising:
a light source configured to emit light directed at a target;
a first detector configured to detect arrival times for photons of the light after the light is scattered by the target;
a second detector configured to function as both a temperature sensor configured to output a temperature signal representative of a temperature of the light source and an optical sensor configured to output a power signal representative of an optical power level of the light emitted by the light source; and
a driver circuit configured to output, based on the temperature signal and the power signal output by the second detector, an input current for the light source.

2. The optical measurement system of claim 1, wherein the outputting the input current comprises:
adjusting, based on the temperature, the power signal to determine an actual power level of the light emitted by the light source; and
adjusting, based on the actual power level, a reference power level input to the driver circuit to generate the input current.

3. The optical measurement system of claim 2, wherein the outputting the input current further comprises:
adjusting, based on the temperature, the reference power level to generate a feedforward current; and
adjusting, based on the adjusting the reference power level based on the actual power level, the feedforward current to generate the input current.

4. The optical measurement system of claim 3, wherein:
the adjusting the reference power level comprises subtracting the actual power level from the reference power level to determine a power level difference;
the driver circuit is further configured to generate a difference current that corresponds to the power level difference; and
the adjusting the feedforward current comprises adding the difference current to the feedforward current.

5. The optical measurement system of claim 1, wherein the second detector comprises a single photon avalanche diode (SPAD).

6. The optical measurement system of claim 5, wherein the outputting the power level comprises generating a histogram based on arrival times of photons of additional light emitted by the light source, the additional light directed at the SPAD.

7. The optical measurement system of claim 1, further comprising a processing unit configured to:
generate, based on the arrival times of the photons at the first detector, histogram data associated with the target; and
determine, based on the histogram data, a property of the target.

8. The optical measurement system of claim 7, wherein the processing unit comprises a portion of the driver circuit.

9. The optical measurement system of claim 1, further comprising a wearable assembly configured to be worn by a user, the wearable assembly configured to house the light source, the first detector, the second detector, and the driver circuit.

10. The optical measurement system of claim 9, wherein:
the wearable assembly is configured to be worn on a head of the user; and
the target comprises a brain of the user.

11. The optical measurement system of claim 9, wherein the wearable assembly is configured to be worn on a finger of the user.

12. The optical measurement system of claim 9, wherein the wearable assembly is configured to be worn on a wrist of the user.

13. A wearable system for use by a user comprising:
a component configured to be attached to a body of the user, the component comprising:
a light source configured to emit light directed at a target within the body;
an array of photodetectors configured to detect photons of light after the light reflects off the target;
a detector configured to function as both a temperature sensor configured to output a temperature signal representative of a temperature of the light source and an optical sensor configured to output a power signal representative of an optical power level of the light emitted by the light source; and
a driver circuit configured to output, based on the temperature signal and the power signal, an input current for the light source.

14. The wearable system of claim 13, wherein the outputting the input current comprises:
adjusting, based on the temperature, the power signal to determine an actual power level of the light emitted by the light source; and
adjusting, based on the actual power level, a reference power level input to the driver circuit to generate the input current.

15. The wearable system of claim 14, wherein the outputting the input current further comprises:
adjusting, based on the temperature, the reference power level to generate a feedforward current; and
adjusting, based on the adjusting the reference power level based on the actual power level, the feedforward current to generate the input current.

16. The wearable system of claim 15, wherein:
the adjusting the reference power level comprises subtracting the actual power level from the reference power level to determine a power level difference;
the driver circuit is further configured to generate a difference current that corresponds to the power level difference; and
the adjusting the feedforward current comprises adding the difference current to the feedforward current.

17. The wearable system of claim 13, wherein the detector comprises an additional array of photodetectors.

18. The wearable system of claim 17, wherein the outputting the power level comprises generating a histogram based on arrival times of photons of additional light emitted by the light source, the additional light directed at the additional array of photodetectors.

19. The wearable system of claim 13, further comprising a processing unit configured to:
generate, based on an output of the array of photodetectors, histogram data associated with the target; and
determine, based on the histogram data, a property of the target.

20. The wearable system of claim 13, wherein each photodetector of the array of photodetectors comprises a single photon avalanche diode (SPAD).

21. The wearable system of claim 13, wherein the component is configured to be worn on a head of the user.

22. The wearable system of claim 13, wherein the component is configured to be worn on a finger of the user.

23. The wearable system of claim 13, wherein the component is configured to be worn on a wrist of the user.

24. A method comprising:
   receiving, by a driver circuit, a temperature signal representative of a temperature of a light source configured to emit light directed at a target;
   receiving, by the driver circuit, a power signal representative of an optical power level of the light emitted by the light source; and
   outputting, by the driver circuit, based on the temperature signal and the power signal, an input current for the light source;
   wherein the temperature signal and the power signal are both output by a detector configured to function as both a temperature sensor and an optical sensor.

25. The method of claim 24, wherein the outputting the input current comprises:
   adjusting, by the driver circuit, based on the temperature, the power signal to determine an actual power level of the light emitted by the light source; and
   adjusting, by the driver circuit, based on the actual power level, a reference power level input to the driver circuit to generate the input current.

26. The method of claim 25, wherein the outputting the input current further comprises:
   adjusting, by the driver circuit, based on the temperature, the reference power level to generate a feedforward current; and
   adjusting, by the driver circuit, based on the adjusting the reference power level based on the actual power level, the feedforward current to generate the input current.

27. The method of claim 26, wherein:
   the adjusting the reference power level comprises subtracting the actual power level from the reference power level to determine a power level difference;
   the method further comprises generating, by the driver circuit, a difference current that corresponds to the power level difference; and
   the adjusting the feedforward current comprises adding the difference current to the feedforward current.

* * * * *